US012621083B2

(12) United States Patent
Li et al.

(10) Patent No.: US 12,621,083 B2
(45) Date of Patent: May 5, 2026

(54) DATA TRANSMISSION METHOD AND APPARATUS

(71) Applicant: HUAWEI TECHNOLOGIES CO., LTD., Shenzhen (CN)

(72) Inventors: Zhongfeng Li, Shanghai (CN); Zhe Liu, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 543 days.

(21) Appl. No.: 18/162,465

(22) Filed: Jan. 31, 2023

(65) Prior Publication Data

US 2023/0171035 A1 Jun. 1, 2023

Related U.S. Application Data

(63) Continuation of application No. PCT/CN2021/104579, filed on Jul. 5, 2021.

(30) Foreign Application Priority Data

Jul. 31, 2020 (CN) .......................... 202010761945.0

(51) Int. Cl.
H04L 1/18 (2023.01)
H04L 1/1809 (2023.01)
(Continued)

(52) U.S. Cl.
CPC .......... H04L 1/1809 (2013.01); H04L 1/1819 (2013.01); H04L 5/0055 (2013.01); H04W 72/20 (2023.01)

(58) Field of Classification Search
CPC ..... H04L 1/18; H04L 1/16; H04L 1/08; H04L 5/00; H04L 1/00; H04L 12/18;
(Continued)

(56) References Cited

U.S. PATENT DOCUMENTS 9,894,651 B2 * 2/2018 Novlan ............. H04W 72/0446
11,134,469 B2 * 9/2021 Abraham .......... H04W 72/0466
(Continued)

FOREIGN PATENT DOCUMENTS

CN 102013965 A 4/2011

OTHER PUBLICATIONS

"3rd Generation Partnership Project; Technical Specification Group Radio Access Network; Overall description of Radio Access Network (RAN) aspects for Vehicle-to-everything (V2X) based on LTE and NR (Release 16)," 3GPP TR 37.985 V1.1.0, total 34 pages, 3rd Generation Partnership Project, Valbonne, France (Feb. 2020).

*Primary Examiner* — Man U Phan
(74) *Attorney, Agent, or Firm* — Leydig, Voit & Mayer, Ltd.

(57) ABSTRACT

A data transmission method and an apparatus are provided. A transmit device sends a plurality of pieces of data, wherein different data in the data occupies different transmission resources. A first receive device in a multicast group receives the data; determines a first feedback message based on a decoding result of the data; feeds back the first feedback message to the transmit device which distinguishes, based on the first feedback message, which data in the plurality of pieces of data is correctly decoded by the multicast group and which data is not, wherein the first feedback message indicates whether the first receive device correctly decodes the data; and performs network encoding transmission on the incorrectly decoded data, thereby improving retransmission efficiency, reducing a delay, and saving feedback resources.

20 Claims, 14 Drawing Sheets

(51) Int. Cl.
  *H04L 1/1812* (2023.01)
  *H04L 5/00* (2006.01)
  *H04W 72/20* (2023.01)

(58) Field of Classification Search
  CPC ..... H04W 72/20; H04W 72/23; H04W 72/04;
    H04W 72/02; H04W 72/00; H04W 72/12;
    H04W 72/14; H04W 72/25; H04W 76/11;
    H04W 76/27; H04W 76/40; H04W 4/06;
    H04W 8/24
  USPC ........................................................ 370/329
  See application file for complete search history.

(56) References Cited

U.S. PATENT DOCUMENTS

| | | | | |
|---|---|---|---|---|
| 11,329,839 | B2 * | 5/2022 | Belleschi .................. | H04L 1/00 |
| 11,533,741 | B2 * | 12/2022 | Wu ................... | H04W 72/1268 |
| 11,736,239 | B2 * | 8/2023 | Liu ....................... | H04W 72/23 |
| | | | | 370/329 |
| 12,096,427 | B2 * | 9/2024 | Lu ........................... | H04L 1/189 |
| 12,244,421 | B2 * | 3/2025 | Khoshnevisan ...... | H04L 1/1621 |
| 12,301,366 | B2 * | 5/2025 | Liu ....................... | H04W 76/11 |
| 2013/0148563 | A1 * | 6/2013 | Brueck ................ | H04L 1/1854 |
| | | | | 370/312 |
| 2021/0135794 | A1 * | 5/2021 | Wang ................... | H04L 5/0055 |
| 2021/0250905 | A1 * | 8/2021 | Liu ....................... | H04L 5/0055 |
| 2023/0019024 | A1 * | 1/2023 | Stare .................... | H04L 1/1812 |
| 2023/0091636 | A1 * | 3/2023 | Khoshnevisan ........ | H04W 8/24 |
| | | | | 370/329 |

* cited by examiner

Core network device

Satellite
observation station

Transmit device

Electronic
device 1

Electronic
device 2

Electronic
device 3

| Data 1 | Data 2 | Data 3 | | | |
|---|---|---|---|---|---|
| UE 4, UE 8, and UE 12 | UE 4, UE 8, and UE 12 | UE 4, UE 8, and UE 12 | d1 | ACK+NACK+ACK | Group 4 |
| UE 3, UE 7, and UE 11 | UE 3, UE 7, and UE 11 | UE 3, UE 7, and UE 11 | c1 | ACK+ACK+NACK | Group 3 |
| UE 2, UE 6, and UE 10 | UE 2, UE 6, and UE 10 | UE 2, UE 6, and UE 10 | b1 | NACK+ACK+ACK | |
| UE 1, UE 5, and UE 9 | UE 1, UE 5, and UE 9 | UE 1, UE 5, and UE 9 | a1 | ACK+ACK+ACK | Group 2 |

Data 1          Data 2          Data 3                    Network encoding
                                                          retransmission Multicast
group 2 Data 2

Multicast
group 1 Data 1

| NN | AA | NA | AN |
|---|---|---|---|
| t1 | t2 | t3 | t4 |

DATA TRANSMISSION METHOD AND APPARATUS

CROSS-REFERENCE TO RELATED APPLICATIONS

This application is a continuation of International Application No. PCT/CN2021/104579, filed on Jul. 5, 2021, which claims priority to Chinese Patent Application No. 202010761945.0, filed on Jul. 31, 2020. The disclosures of the aforementioned applications are hereby incorporated by reference in their entireties.

TECHNICAL FIELD

Embodiments of this application relate to the field of communication technologies, and in particular, to a data transmission method and an apparatus.

BACKGROUND

In recent years, wireless communication technologies develop rapidly, and the 3rd generation mobile communication partnership project (the 3rd Generation Partner Project, 3GPP) gradually evolves to the 5th generation (5G) technology. Multicast communication is a typical communication mode proposed by the 3GPP.

In the multicast communication, a transmit device sends data to a plurality of receive devices in a multicast group. After the receive device receives the data, if the receive device correctly decodes the data, the receive device feeds back an acknowledgment (ACK) message to the transmit device on a feedback resource. If the receive device fails to correctly decode the data, the receive device feeds back a negative acknowledgment (NACK) message to the transmit device on the feedback resource. After the transmit device sends data for a plurality of times, the receive device sends a feedback to the transmit device on a feedback resource corresponding to each piece of data. For the transmit device, the transmit device can learn of a feedback status of the receive device for each piece of data based on the feedback message. Therefore, the transmit device can determine, based on the feedback of the receive device, whether to perform network encoding retransmission. For example, the transmit device multicasts first data at a moment 1, and multicasts second data at a moment 2. The multicast group includes a receive device 1 and a receive device 2. The receive device 1 feeds back the ACK message for the first data, and feeds back the NACK message for the second data. The receive device 2 feeds back the NACK message for the first data, and feeds back the ACK message for the second data. The transmit device performs network encoding retransmission on the first data sent at the moment 1 through multicast and the second data sent at the moment 2 through multicast.

A solution of feeding back only a NACK message (NACK only) is proposed in the industry to save feedback resources. In this solution, a receive device in a multicast group feeds back only the NACK message but does not feed back an ACK message. Each time after a transmit device sends data, provided that one receive device in the multicast group feeds back the NACK message, the transmit device considers that the multicast group fails to correctly decode the data. It is clear that, in the NACK-only solution, the transmit device cannot perform efficient network encoding retransmission.

SUMMARY

Embodiments of this application provide a data transmission method and an apparatus. A receive device performs joint HARQ feedback on a plurality of pieces of data sent by a transmit device through multicast, so that the transmit device can distinguish data that is in the data and that is not correctly decoded by a multicast group, and the transmit device performs network encoding transmission. In this way, retransmission efficiency is improved and feedback resources are saved.

According to a first aspect, an embodiment of this application provides a data transmission method. The method is applied to a first receive device or a chip in the first receive device. The following describes the method by using an example in which the method is applied to the first receive device. The method includes: A transmit device sends a plurality of pieces of data through multicast, where different data in the data occupies different transmission resources. The first receive device in a multicast group receives the data, and determines a first feedback message based on a decoding result of the data. The first feedback message indicates whether the first receive device correctly decodes the data. The first receive device feeds back the first feedback message to the transmit device. The transmit device can distinguish, based on the first feedback message, which data in the plurality of pieces of data is correctly decoded by the multicast group and which data is not correctly decoded by the multicast group, to perform network encoding transmission on the data that is in the plurality of pieces of data and that is not correctly received by the multicast group. In this way, retransmission efficiency is improved, a delay is reduced, and feedback resources are saved. Further, when the transmit device performs network encoding transmission, data with a high priority is selected from the data that is not correctly received, and network encoding transmission is preferentially performed on the data with the high priority. For example, the data with the high priority is delay-sensitive data. In this way, a delay is reduced.

In a feasible design, when outputting the first feedback message, the first receive device determines a first feedback resource based on feedback content of the first feedback message. The first feedback resource is included in a feedback resource set, and different first feedback resources in the feedback resource set correspond to different feedback content. In this solution, because the first feedback message one-to-one corresponds to the first feedback resource, after receiving the first feedback message, the transmit device can identify which data is correctly received and which data is not correctly received, to perform network encoding transmission. In this way, retransmission efficiency is improved, a delay is reduced, and feedback resources are saved.

In a feasible design, the first receive device receives a first indication message. The first indication message indicates a group to which the first receive device belongs in a multicast group, and the multicast group includes a plurality of groups. In this solution, receive devices in the multicast group are grouped, and the receive devices are explicitly or implicitly notified. In this way, the transmit device subsequently performs network encoding transmission with receive devices in one or more groups to improve data retransmission efficiency.

In a feasible design, the plurality of pieces of data separately correspond to different multicast groups, and the first feedback message indicates whether the first receive device correctly receives the data of different multicast groups. In this solution, network encoding transmission is performed based on different multicast groups to improve retransmission efficiency.

In a feasible design, the first feedback resource is used to feed back a feedback message including one piece of preset feedback content, and the preset feedback content corresponds to at least one piece of feedback content or at least one decoding state. In this solution, different feedback messages are configured as preset feedback messages to improve retransmission efficiency and save feedback resources.

In a feasible design, the first receive device receives a second indication message. The second indication message indicates the first receive device to perform network encoding transmission with a second receive device. In this solution, the first receive device performs collaborative network encoding transmission in an indication mode.

In a feasible design, the first receive device listens, on a listener resource, to a second feedback message fed back by another receive device in the multicast group. The listener resource is another resource in configured feedback resources other than the first feedback resource, and the first receive device belongs to the multicast group. The first receive device performs network encoded data retransmission based on the second feedback message. In this solution, the receive device that performs collaborative network encoding transmission needs to listen to the feedback message of the another receive device. The collaborative network encoding transmission can improve retransmission efficiency and a diversity gain, and facilitate correct receiving of data.

In a feasible design, the transmission resource includes at least one of the following resources: a frequency resource, a time domain resource, a code domain resource, a space domain resource, and a polarization resource. In this solution, the transmit device flexibly multicasts the data.

In a feasible design, the first receive device further receives a third indication message. The third indication message indicates a redundancy version RV of each of the plurality of pieces of data. The first receive device determines, based on the redundancy version RV of each of the plurality of pieces of data, an RV of each piece of data when the transmit device performs network encoding transmission. In this solution, an RV version of network encoding data transmission is indicated to or preconfigured for the receive device. In this way, signaling indication overheads can be reduced, and multicast communication performance can be improved.

In a feasible design, when determining, based on the redundancy version RV of each of the plurality of pieces of data, the RV of each piece of data when the transmit device performs network encoding transmission, the first receive device queries a preconfigured RV sequence table based on the redundancy version RV of each of the plurality of pieces of data to determine the RV of each piece of data during network encoding transmission performed by the transmit device. The RV sequence table stores a correspondence between an RV version of each piece of data in a current network encoding transmission and an RV version of each piece of data in a previous data transmission.

In a feasible design, the first receive device determines a plurality of encoding subblocks based on a transport block, and the plurality of pieces of data are the plurality of encoding subblocks. The first receive device determines a fourth feedback message based on the plurality of encoding subblocks. The fourth feedback message indicates whether the first receive device correctly receives the encoding subblocks in the transport block. The first receive device outputs the fourth feedback message. In this solution, network encoding transmission of different subblocks of a same transport block is implemented.

In a feasible design, each of the plurality of pieces of data carries a multicast identifier.

According to a second aspect, an embodiment of this application provides a data transmission method. The method may be applied to a transmit device or may be applied to a chip in the transmit device. The following describes the method by using an example in which the method is applied to the transmit device. The method includes: The transmit device sends a plurality of pieces of data through multicast, where different data in the data occupies different transmission resources. The first receive device in a multicast group receives the data, and determines a first feedback message based on a decoding result of the data. The first feedback message indicates whether the first receive device correctly decodes the data. The first receive device feeds back the first feedback message to the transmit device. The transmit device can distinguish, based on the first feedback message, which data in the plurality of pieces of data is correctly decoded by the multicast group and which data is not correctly decoded by the multicast group, to perform network encoding transmission on the data that is in the plurality of pieces of data and that is not correctly received by the multicast group. In this way, retransmission efficiency is improved, a delay is reduced, and feedback resources are saved.

In a feasible design, the first feedback message occupies a first feedback resource, the first feedback resource is included in a feedback resource set, and different first feedback resources in the feedback resource set correspond to different feedback content. In this solution, because feedback content of the first feedback message one-to-one corresponds to the first feedback resource, after receiving the first feedback message, the transmit device can identify which data is correctly received and which data is not correctly received, to perform network encoding transmission. In this way, retransmission efficiency is improved, a delay is reduced, and feedback resources are saved.

In a feasible design, the transmit device receives a second feedback message on a second feedback resource. The second feedback message indicates whether a second receive device correctly receives the plurality of pieces of data, the first feedback message is different from the second feedback message, and the first feedback resource is different from the second feedback resource. In this solution, different feedback messages occupy different feedback resources, and different feedback messages indicate different data that is not correctly received by the multicast group. Therefore, the transmit device can easily distinguish which data is correctly received and which data is not correctly received. In this way, network encoding transmission efficiency is improved.

In a feasible design, the transmit device receives a second feedback message on the first feedback resource. The second feedback message indicates whether a second receive device correctly receives the plurality of pieces of data, and the first feedback message is the same as the second feedback message. In this solution, because same feedback messages occupy a same feedback resource, resource overheads can be reduced.

In a feasible design, the transmit device receives a second feedback message on the first feedback resource. The second feedback message occupies the first feedback resource, the second feedback message indicates whether a second receive device correctly receives the plurality of pieces of data, and the first feedback message is different from the second feedback message. In this solution, because different feedback messages occupy a same feedback resource, resource overheads can be reduced.

In a feasible design, the first feedback resource is used to feed back a feedback message including one piece of preset feedback content, and the preset feedback content corresponds to at least one piece of feedback content or at least one decoding state. In this solution, because different data decoding states correspond to same feedback content and occupy a same feedback resource, resource overheads can be reduced.

In a feasible design, the transmit device sends a first indication message. The first indication message indicates a group to which the first receive device belongs in the multicast group, the multicast group includes a plurality of groups, and the first receive device and the second receive device belong to a same group in the multicast group. In this solution, receive devices in the multicast group are grouped, and the receive devices are explicitly or implicitly notified. In this way, the transmit device subsequently performs network encoding transmission with receive devices in one or more groups to improve data retransmission efficiency.

In a feasible design, the transmit device receives a third feedback message on a third feedback resource. The third feedback message indicates whether a third receive device correctly receives the plurality of pieces of data, the first receive device belongs to a first group in the multicast group, the third receive device belongs to a second group in the multicast group, and the third feedback resource is different from the first feedback resource. In this solution, different groups feed back on different feedback resources. In this way, the transmit device subsequently performs network encoding transmission only for receive devices in one or more groups to improve data retransmission efficiency.

In a feasible design, that the transmit device performs network encoding transmission based on the feedback message includes: The transmit device performs network encoding transmission with each receive device in the first group and the second group based on the first feedback message and the third feedback message. In this solution, when performing network encoding transmission, the transmit device performs network encoding transmission only for receive devices in one or more groups based on feedback messages of different groups to improve data retransmission efficiency.

In a feasible design, the plurality of pieces of data separately correspond to different multicast groups, and the first feedback message indicates whether the first receive device correctly receives the data of different multicast groups. In this solution, joint feedback between different multicast groups is implemented.

In a feasible design, the transmit device sends a second indication message. The second indication message indicates the first receive device to perform network encoding transmission with the second receive device. In this solution, data is correctly received through collaborative network encoding transmission.

In a feasible design, the transmission resource includes at least one of the following resources: a frequency resource, a time domain resource, a code domain resource, a space domain resource, and a polarization resource. In this solution, the transmit device flexibly multicasts the data.

In a feasible design, the transmit device determines, based on an RV of each of the plurality of pieces of data, an RV of each piece of data during network encoding transmission.

The transmit device sends a third indication message to the first receive device. The third indication message indicates the redundancy version RV of each of the plurality of pieces of data. In this solution, an RV version of network encoding data transmission is indicated to or preconfigured for the receive device. In this way, signaling indication overheads can be reduced, and multicast communication performance can be improved.

In a feasible design, the transmit device receives a fourth feedback message. The fourth feedback message indicates whether the first receive device correctly receives encoding subblocks in a first transport block, and the plurality of pieces of data are the encoding subblocks in the first transport block. In this solution, network encoding transmission of different subblocks of a same transport block is implemented.

According to a third aspect, an embodiment of this application provides a data transmission method. The method may be applied to a receive device or may be applied to a chip in the receive device. The following describes the method by using an example in which the method is applied to the receive device. The method includes: A first receive device receives a plurality of pieces of data, determines a plurality of feedback messages based on the plurality of pieces of data, and outputs the plurality of feedback messages. Different data in the plurality of pieces of data occupies different transmission resources, and a feedback message in the plurality of feedback messages one-to-one corresponds to data in the plurality of pieces of data. In this solution, receive devices in a same group independently feed back for the plurality of pieces of data, and a transmit device performs network encoding transmission based on feedback messages in different groups to improve data retransmission efficiency.

According to a fourth aspect, an embodiment of this application provides a data transmission method. The method may be applied to a transmit device or may be applied to a chip in the transmit device. The following describes the method by using an example in which the method is applied to the transmit device. The method includes: The transmit device sends a plurality of pieces of data through multicast, receives feedback messages on a plurality of feedback resources, and performs network encoding transmission based on the feedback messages on the plurality of feedback resources. Different data in the plurality of pieces of data occupies different transmission resources, different feedback resources in the plurality of feedback resources correspond to different groups in a multicast group, and the multicast group includes at least a first group and a second group. The first group includes a first receive device, a sub-resource in a first feedback resource corresponding to the first group one-to-one corresponds to data in the plurality of pieces of data, and when feedback messages of different receive devices in the first group for a same piece of data in the plurality of pieces of data are the same, the feedback messages of different receive devices occupy a same sub-resource in the first feedback resource. In this solution, receive devices in a same group independently feed back for the plurality of pieces of data, and the transmit device performs network encoding transmission based on feedback messages in different groups to improve data retransmission efficiency.

According to a fifth aspect, an embodiment of this application provides a communication apparatus, including:

a processing unit, configured to: obtain a plurality of pieces of data, where different data in the plurality of pieces of data occupies different transmission resources, and determine a first feedback message based on the plurality of pieces of data, where the first feedback message indicates whether a first receive device correctly receives the plurality of pieces of data; and an output unit, configured to output the first feedback message.

In a feasible design, the processing unit is configured to determine a first feedback resource based on feedback content of the first feedback message, the first feedback resource is included in a feedback resource set, and different first feedback resources in the feedback resource set correspond to different feedback content.

The output unit is configured to output the first feedback message on the first feedback resource.

In a feasible design, the foregoing apparatus further includes an input unit, configured to receive a first indication message. The first indication message indicates a group to which the first receive device belongs in a multicast group, and the multicast group includes a plurality of groups.

In a feasible design, the plurality of pieces of data separately correspond to different multicast groups, and the first feedback message indicates whether the first receive device correctly receives the data of different multicast groups.

In a feasible design, the first feedback resource is used to feed back a feedback message including one piece of preset feedback content, and the preset feedback content corresponds to at least one piece of feedback content or at least one decoding state.

In a feasible design, the input unit is configured to receive a second indication message. The second indication message indicates the first receive device to perform network encoding transmission with a second receive device.

In a feasible design, the processing unit is further configured to: listen, on a listener resource, to a second feedback message fed back by another receive device in the multicast group, and perform network encoded data retransmission based on the second feedback message. The listener resource is another resource in configured feedback resources other than the first feedback resource, and the first receive device belongs to the multicast group.

In a feasible design, the transmission resource includes at least one of the following resources: a frequency resource, a time domain resource, a code domain resource, a space domain resource, and a polarization resource.

In a feasible design, the input unit is configured to receive a third indication message. The third indication message indicates a redundancy version RV of each of the plurality of pieces of data. The processing unit is further configured to determine, based on the redundancy version RV of each of the plurality of pieces of data, an RV of each piece of data when a transmit device performs network encoding transmission.

In a feasible design, the processing unit is configured to query a preconfigured RV sequence table based on the redundancy version RV of each of the plurality of pieces of data to determine the RV of each piece of data during network encoding transmission performed by the transmit device. The RV sequence table stores a correspondence between an RV version of each piece of data in a current network encoding transmission and an RV version of each piece of data in a previous data transmission.

In a feasible design, the processing unit is further configured to: determine a plurality of encoding subblocks based on a transport block, and determine a fourth feedback message based on the plurality of encoding subblocks. The plurality of pieces of data are the plurality of encoding subblocks, and the fourth feedback message indicates whether the first receive device correctly receives the encoding subblocks in the transport block. The output unit is configured to output the fourth feedback message.

In a feasible design, each of the plurality of pieces of data carries a multicast identifier.

According to a sixth aspect, an embodiment of this application provides a communication apparatus, including:

an output unit, configured to send a plurality of pieces of data, where different data in the plurality of pieces of data occupies different transmission resources;

an input unit, configured to receive a first feedback message, where the first feedback message indicates whether a first receive device correctly receives the plurality of pieces of data; and a processing unit, configured to perform network encoding transmission based on the first feedback message.

In a feasible design, the first feedback message occupies a first feedback resource, the first feedback resource is included in a feedback resource set, and different first feedback resources in the feedback resource set correspond to different feedback content.

In a feasible design, the input unit is further configured to receive a second feedback message on a second feedback resource. The second feedback message indicates whether a second receive device correctly receives the plurality of pieces of data, the first feedback message is different from the second feedback message, and the first feedback resource is different from the second feedback resource.

In a feasible design, the input unit is further configured to receive a second feedback message on the first feedback resource. The second feedback message indicates whether a second receive device correctly receives the plurality of pieces of data, and the first feedback message is the same as the second feedback message.

In a feasible design, the input unit is further configured to receive a second feedback message on the first feedback resource. The second feedback message occupies the first feedback resource, the second feedback message indicates whether a second receive device correctly receives the plurality of pieces of data, and the first feedback message is different from the second feedback message.

In a feasible design, the first feedback resource is used to feed back a feedback message including one piece of preset feedback content, and the preset feedback content corresponds to at least one piece of feedback content or at least one decoding state.

In a feasible design, the output unit is further configured to send a first indication message. The first indication message indicates a group to which the first receive device belongs in the multicast group, the multicast group includes a plurality of groups, and the first receive device and a second receive device belong to a same group in the multicast group.

In a feasible design, the input unit is further configured to receive a third feedback message on a third feedback resource. The third feedback message indicates whether a third receive device correctly receives the plurality of pieces of data, the first receive device belongs to a first group in the multicast group, the third receive device belongs to a second group in the multicast group, and the third feedback resource is different from the first feedback resource.

In a feasible design, the processing unit is configured to perform network encoding transmission with each receive device in the first group and the second group based on the first feedback message and the third feedback message.

In a feasible design, the plurality of pieces of data separately correspond to different multicast groups, and the first feedback message indicates whether the first receive device correctly receives the data of different multicast groups.

In a feasible design, the output unit is further configured to send a second indication message. The second indication message indicates the first receive device to perform network encoding transmission with the second receive device.

In a feasible design, the transmission resource includes at least one of the following resources: a frequency resource, a time domain resource, a code domain resource, a space domain resource, and a polarization resource.

In a feasible design, the processing unit is further configured to determine, based on an RV of each of the plurality of pieces of data, an RV of each piece of data during network encoding transmission. The output unit is further configured to send a third indication message to the first receive device. The third indication message indicates the redundancy version RV of each of the plurality of pieces of data.

In a feasible design, the input unit is further configured to receive a fourth feedback message. The fourth feedback message indicates whether the first receive device correctly receives encoding subblocks in a first transport block, and the plurality of pieces of data are the encoding subblocks in the first transport block.

According to a seventh aspect, an embodiment of this application provides a communication apparatus, including:

an input unit, configured to receive a plurality of pieces of data, where different data in the plurality of pieces of data occupies different transmission resources;

a processing unit, configured to determine a plurality of feedback messages based on the plurality of pieces of data, where a feedback message in the plurality of feedback messages one-to-one corresponds to data in the plurality of pieces of data; and an output unit, configured to output the plurality of feedback messages.

According to an eighth aspect, an embodiment of this application provides a communication apparatus, including:

an output unit, configured to send a plurality of pieces of data through multicast, where different data in the plurality of pieces of data occupies different transmission resources; and a processing unit, configured to: receive feedback messages on a plurality of feedback resources, and perform network encoding transmission based on the feedback messages on the plurality of feedback resources. Different feedback resources in the plurality of feedback resources correspond to different groups in a multicast group, and the multicast group includes at least a first group and a second group. The first group includes a first receive device, a sub-resource in a first feedback resource corresponding to the first group one-to-one corresponds to data in the plurality of pieces of data, and when feedback messages of different receive devices in the first group for a same piece of data in the plurality of pieces of data are the same, the feedback messages of different receive devices occupy a same sub-resource in the first feedback resource.

According to a ninth aspect, an embodiment of this application provides a communication apparatus, including a processor, a memory, and a computer program that is stored in the memory and that can run on the processor. When the processor executes the program, the communication apparatus is enabled to implement the method in the first aspect or the possible implementations of the first aspect.

According to a tenth aspect, an embodiment of this application provides a communication apparatus, including a processor, a memory, and a computer program that is stored in the memory and that can run on the processor. When the processor executes the program, the communication apparatus is enabled to implement the method in the second aspect or the possible implementations of the second aspect.

According to an eleventh aspect, an embodiment of this application provides a communication apparatus, including a processor, a memory, and a computer program that is stored in the memory and that can run on the processor. When the processor executes the program, the communication apparatus is enabled to implement the method in the third aspect or the possible implementations of the third aspect.

According to a twelfth aspect, an embodiment of this application provides a communication apparatus, including a processor, a memory, and a computer program that is stored in the memory and that can run on the processor. When the processor executes the program, the communication apparatus is enabled to implement the method in the fourth aspect or the possible implementations of the third aspect.

According to a thirteenth aspect, an embodiment of this application provides a communication apparatus, including a logic circuit and an input interface. The input interface is configured to obtain to-be-processed data, and the logic circuit is configured to perform, on the to-be-processed data, the method according to any one of the first aspect to obtain processed data.

In a feasible design, the communication apparatus further includes an output interface, and the output interface is configured to output the processed data.

According to a fourteenth aspect, an embodiment of this application provides a communication apparatus, including a logic circuit and an input interface. The input interface is configured to obtain to-be-processed data, and the logic circuit is configured to perform, on the to-be-processed data, the method according to any one of the second aspect to obtain processed data.

In a feasible design, the communication apparatus further includes an output interface, and the output interface is configured to output the processed data.

According to a fifteenth aspect, an embodiment of this application provides a communication apparatus, including a logic circuit and an input interface. The input interface is configured to obtain to-be-processed data, and the logic circuit is configured to perform, on the to-be-processed data, the method according to any one of the third aspect to obtain processed data.

In a feasible design, the communication apparatus further includes an output interface, and the output interface is configured to output the processed data.

According to a sixteenth aspect, an embodiment of this application provides a communication apparatus, including a logic circuit and an input interface. The input interface is configured to obtain to-be-processed data, and the logic circuit is configured to perform, on the to-be-processed data, the method according to any one of the fourth aspect to obtain processed data.

In a feasible design, the communication apparatus further includes an output interface, and the output interface is configured to output the processed data.

According to a seventeenth aspect, an embodiment of this application provides a computer-readable storage medium. The computer-readable storage medium is configured to store a program, and when the program is executed by a processor, the program is used to perform the method according to any one of the first aspect.

According to an eighteenth aspect, an embodiment of this application provides a computer-readable storage medium. The computer-readable storage medium is configured to store a program, and when the program is executed by a processor, the program is used to perform the method according to any one of the second aspect.

According to a nineteenth aspect, an embodiment of this application provides a computer-readable storage medium. The computer-readable storage medium is configured to store a program, and when the program is executed by a processor, the program is used to perform the method according to any one of the third aspect.

According to a twentieth aspect, an embodiment of this application provides a computer-readable storage medium. The computer-readable storage medium is configured to store a program, and when the program is executed by a processor, the program is used to perform the method according to any one of the fourth aspect.

According to a twenty-first aspect, an embodiment of this application provides a computer program product. When the computer program product runs on a communication apparatus, the communication apparatus is enabled to perform the method according to any one of the first aspect.

According to a twenty-second aspect, an embodiment of this application provides a computer program product. When the computer program product runs on a communication apparatus, the communication apparatus is enabled to perform the method according to any one of the second aspect.

According to a twenty-third aspect, an embodiment of this application provides a computer program product. When the computer program product runs on a communication apparatus, the communication apparatus is enabled to perform the method according to any one of the third aspect.

According to a twenty-fourth aspect, an embodiment of this application provides a computer program product. When the computer program product runs on a communication apparatus, the communication apparatus is enabled to perform the method according to any one of the fourth aspect.

According to the data transmission method provided in embodiments of this application, the transmit device sends the plurality of pieces of data through multicast, where different data in the data occupies different transmission resources. The first receive device in the multicast group receives the data, and determines the first feedback message based on the decoding result of the data. The first feedback message indicates whether the first receive device correctly decodes the data. The first receive device feeds back the first feedback message to the transmit device. The transmit device can distinguish, based on the first feedback message, which data in the plurality of pieces of data is correctly decoded by the multicast group and which data is not correctly decoded by the multicast group, to perform network encoding transmission on the data that is in the plurality of pieces of data and that is not correctly received by the multicast group. In this way, retransmission efficiency is improved, a delay is reduced, and feedback resources are saved.

DESCRIPTION OF EMBODIMENTS

With rapid development of wireless communication technologies, 3GPP standards gradually evolve from the 3rd generation (3G) technology and the 4th generation (4G) technology to the 5th generation technology. In addition, the Institute of Electrical and Electronics Engineers (IEEE) standards also evolve. Correspondingly, communication modes based on the 3GPP and IEEE standards gradually develop from point-to-point communication to point-to-multipoint communication. Communication quality gradually develops from low reliability to high reliability, a communication delay gradually develops from a high delay to a low delay, a communication range gradually develops from communication of a small quantity of users to communication of a large quantity of users, and communication objects gradually develop from people-to-people communication to people-to-things communication and things-to-things communication.

Multicast communication is a typical communication mode. Multicast communication is also referred to as multicast, and broadcast is a special multicast communication mode. In multicast communication, one communication device (a transmit device) multicasts a message to a plurality of communication devices (receive devices). To ensure reliability of the multicast communication, the receive device feeds back to the transmit device based on a decoding state. For example, if failing to correctly decode the message, the receive device feeds back a NACK message to the transmit device: or if correctly decoding the message, the receive device feeds back an ACK message to the transmit device. The transmit device determines, based on the received feedback message, whether to perform retransmission. This ensures reliable multicast communication. In a feedback process, the receive device performs hybrid automatic repeat request (HARQ) feedback on a specific feedback resource for the receive device, for example, feeds back the NACK message or the ACK message.

Figure 1:
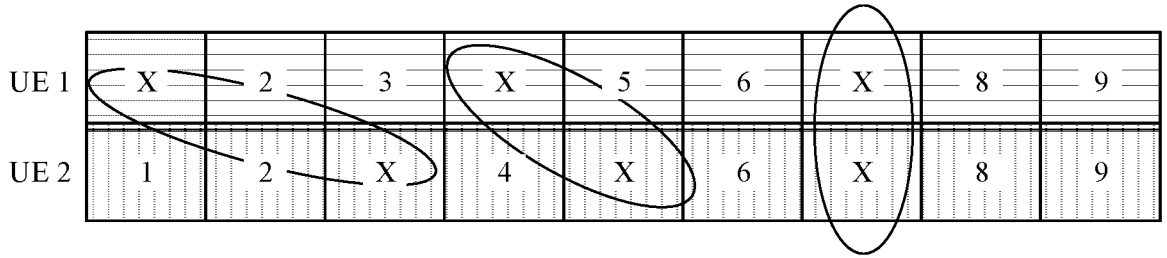
FIG. 1 is a schematic diagram of a HARQ feedback.

FIG. 1 is a schematic diagram of a HARQ feedback. Refer to FIG. 1. A multicast group includes two receive devices: user equipment (UE) 1 and UE 2. A transmit device multicasts one piece of data at each moment from a moment 1 to a moment 9. For the UE 1, each of the nine pieces of data corresponds to one feedback resource, as shown by a part filled with horizontal lines in the figure. For the UE 2, each of the nine pieces of data corresponds to one feedback resource, as shown by a part filled with vertical lines in the figure. If the UE 1 fails to correctly decode a piece of data, the UE 1 feeds back a NACK message on a feedback resource corresponding to the data, as shown by "X" in the figure. Similarly, if the UE 2 fails to correctly decode a piece of data, the UE 2 feeds back a NACK message on a feedback resource corresponding to the data, as shown by "X" in the figure. A remaining digital part indicates that the UE 1 or the UE 2 feeds back an ACK message to the transmit device.

Refer to FIG. 1. For the data at the moment 1 and the data at the moment 3, feedback messages of the UE 1 are respectively the NACK message and the ACK message, and feedback messages of the UE 2 are respectively the ACK message and the NACK message. Therefore, the transmit device can perform network encoding retransmission on the data at the moment 1 and the data at the moment 3, as shown by the leftmost ellipse in the figure. The network encoding retransmission refers to performing an exclusive OR (XOR) operation bit by bit on the data at the moment 1 and the data at the moment 3.

Similarly, for the data at the moment 4 and the data at the moment 5, feedback messages of the UE 1 are respectively the NACK message and the ACK message, and feedback messages of the UE 2 are respectively the ACK message and the NACK message. Therefore, the transmit device can perform network encoding retransmission on the data at the moment 4 and the data at the moment 5, as shown by the middlemost ellipse in the figure. The network encoding retransmission refers to performing an exclusive OR (XOR) operation bit by bit on the data at the moment 4 and the data at the moment 5.

For the data at the moment 7, both the UE 1 and the UE 2 feed back the NACK messages, as shown in the rightmost ellipse in the figure. In this case, the transmit device separately performs HARQ retransmission on the data at the moment 7, but does not perform network encoding retransmission.

In the foregoing data retransmission process, each receive device in the multicast group has a specific feedback resource, and the receive device feeds back for each piece of data on the feedback resource. In this way, the transmit device is clearly aware of a status of receiving all multicast data by each receive device. When feedback messages of different receive devices for data at two different moments are respectively {ACK, NACK} and {NACK, ACK}, as shown by the leftmost and middlemost ellipses in the figure, the transmit device can perform network encoding retransmission. However, when a quantity of receive devices in the multicast group increases, because a feedback resource needs to be configured for each receive device in the multicast group, system overheads are high, resource consumption is excessively high, and even feedback resources are insufficient.

A NACK only solution is proposed in the industry to save feedback resources. In the NACK only solution, a shared feedback resource is configured for a receive device in a multicast group for each piece of data. When the receive device in the multicast group fails to correctly decode the data, the receive device feeds back a NACK message on the shared feedback resource. After receiving the NACK message, a transmit device performs data retransmission to ensure reliability of multicast communication.

Figure 2:
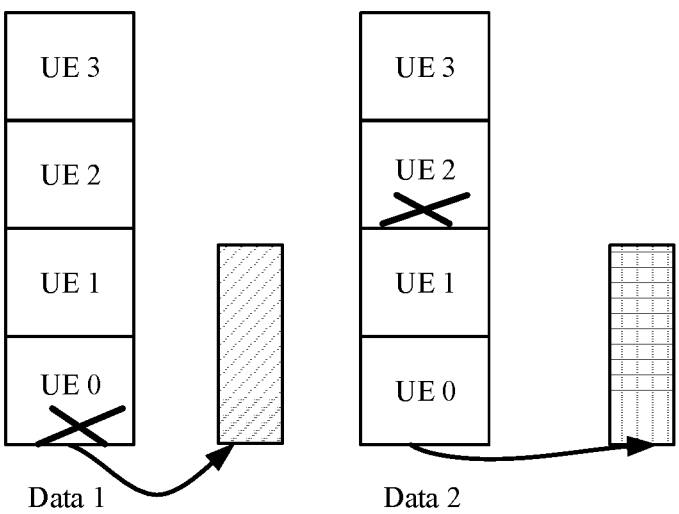
FIG. 2 is a schematic diagram of a feedback of a NACK only solution.

FIG. 2 is a schematic diagram of a feedback of a NACK only solution. Refer to FIG. 2. A multicast group includes four receive devices: UE 0, UE 1, UE 2, and UE 3. A transmit device multicasts data 1 and data 2. The UE 0 fails to correctly decode the data 1, and the UE 2 fails to correctly decode the data 2. In this case, the UE 0 feeds back a NACK message on a shared feedback resource (as shown by a part filled with slashes in the figure) corresponding to the data 1, and the UE 2 feeds back the NACK message on a shared feedback resource (as shown by a part filled with grids in the figure) corresponding to the data 2.

It can be learned from FIG. 2 that for each piece of data, if a receive device that fails to correctly decode the data exists in the multicast group, the transmit device receives the NACK message on a shared feedback resource corresponding to the data. In this case, the transmit device considers that the multicast group fails to correctly decode the data, and can only perform HARQ retransmission on each piece of data or perform network encoding retransmission on all pieces of data. If network encoding retransmission is performed on all data packets until the data is correctly received by the multicast group, network encoding retransmission time is long, and network encoding retransmission cannot be efficiently performed on each piece of multicast data.

In view of this, embodiments of this application provide a data transmission method. A receive device performs joint HARQ feedback on a plurality of pieces of data sent by a transmit device through multicast, so that the transmit device performs network encoding transmission based on the feedback. In this way, retransmission efficiency is improved and feedback resources are saved.

In the specification, claims, and accompanying drawings of this application, the terms "first", "second", "third", and the like are intended to distinguish different objects but do not limit a particular sequence.

In embodiments of this application, a word such as "example" or "for example" is used for representing an example, an example illustration, or description. Any embodiment or design solution described as "example" or "for example" in embodiments of this application is not to be construed as being more preferred or advantageous than other embodiments or design solutions. Exactly, use of the word such as "example" or "for example" is intended to present a related concept in a specific manner.

The data transmission method provided in embodiments of this application can be applied to a 3rd generation (3G) mobile communication system, a long term evolution (LTE) system, a 4th generation (4G) mobile communication system, a long term evolution-advanced (LTE-A) system, a cellular system related to the 3rd generation partnership project (3GPP), a 5th generation (5G) mobile communication system, and a subsequent evolved communication system.

The transmit device in embodiments of this application is an entity, for example, a next-generation Node B (gNodeB) or user equipment (UE), configured to transmit or receive a signal on a network side. A network device is a device configured to communicate with an access device. The network device is an AP in a wireless local area network (WLAN), a base transceiver station (BTS) in a global system for mobile communications (GSM) or code division multiple access (CDMA), a NodeB (NB) in wideband code division multiple access (WCDMA), an evolved NodeB (evolutional Node B, eNB or eNodeB) in long term evolution (LTE), a relay station, an access point, a vehicle-mounted device, a wearable device, a network device in a 5G network, a network device in a future evolved public land mobile network (PLMN), a gNodeB in an NR system, or the like. In addition, in embodiments of this application, the network device serves a cell, and the access device communicates with the network device by using a transmission resource (for example, a frequency domain resource, namely, a spectrum resource) used by the cell. For example, the cell may be a cell corresponding to the network device (for example, a base station). The cell may belong to a macro base station, or may belong to a base station corresponding to a small cell. The small cell herein includes a metro cell, a micro cell, a pico cell, a femto cell, and the like. These small cells have features of a small coverage area and low transmit power, and are applicable to providing a high-rate data transmission service. In addition, in another possible case, the network device is another apparatus that provides a wireless communication function for the access device. A specific technology and a specific device form that are used by the transmit device are not limited in embodiments of this application. For ease of description, in embodiments of this application, the apparatus that provides the wireless communication function for the access device is referred to as the transmit device.

The access device in embodiments of this application is an electronic device that can receive data from the transmit device. For example, the data is data multicast or unicast by the transmit device. For example, the electronic device is a wired electronic device or a wireless electronic device. The wireless electronic device communicates with one or more core networks or the Internet by using a radio access network (for example, a radio access network, RAN). The wireless electronic device is a mobile phone (or referred to as a "cellular" phone or a mobile phone), a computer, a data card, or the like. For example, the wireless electronic device is a portable, pocket-sized, handheld, computer built-in, or vehicle-mounted mobile apparatus that exchanges voice and/or data with a radio access network. For another example, the wireless electronic device is a device such as a personal communications service (PCS) phone, a cordless phone, a session initiation protocol (SIP) phone, a wireless local loop (WLL) station, a personal digital assistant (PDA), a tablet computer (Pad), or a computer having a wireless transceiver function. The wireless electronic device is also referred to as a system, a subscriber unit, a subscriber station, a mobile station (MS), a remote station, an access point (AP), a remote terminal device (remote terminal), an access terminal device (access terminal), a user terminal device (user terminal), a user agent, a subscriber station (SS), customer premises equipment (CPE), a terminal, user equipment (UE), a mobile terminal (MT), or the like. The wireless electronic device may also be a wearable device and a terminal device in a next-generation communication system, or may be a terminal device in an NR communication system, or the like.

Figure 3A:
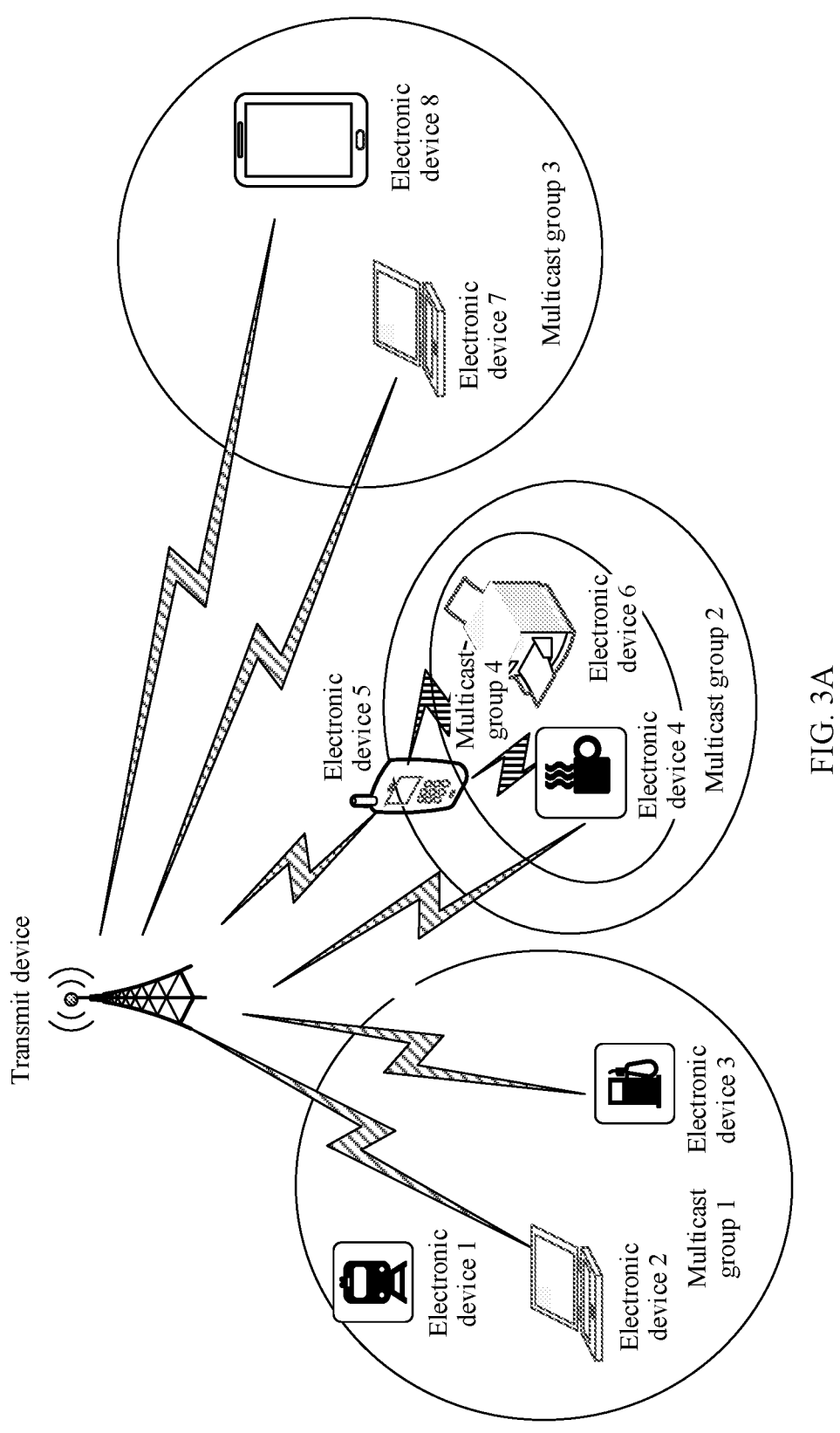
FIG. 3A is a schematic diagram of a network architecture to which a data transmission method is applicable according to an embodiment of this application.

FIG. 3A is a schematic diagram of a network architecture to which a data transmission method is applicable according to an embodiment of this application. Refer to FIG. 3A. An electronic device 1 to an electronic device 3 form a multicast group 1, and a transmit device multicasts data to the multicast group 1. An electronic device 4 to an electronic device 6 form a multicast group 2, and the transmit device multicasts data to the multicast group 2. An electronic device 7 and an electronic device 8 form a multicast group 3, and the transmit device multicasts data to the multicast group 3. In addition, the electronic device 6 and the electronic device 4 form a multicast group 4. In this case, the transmit device is the electronic device 5, and the electronic device 5 multicasts data to the multicast group 4.

In this embodiment of this application, the foregoing multicast group 1 is used as an example. The transmit device sends a plurality of pieces of data to the multicast group 1 through multicast, and a receive device in the multicast group 1 performs joint HARQ feedback on the plurality of pieces of data sent by the transmit device through multicast, so that the transmit device performs network encoding transmission based on the feedback. In this way, retransmission efficiency is improved and feedback resources are saved.

Figure 3B:
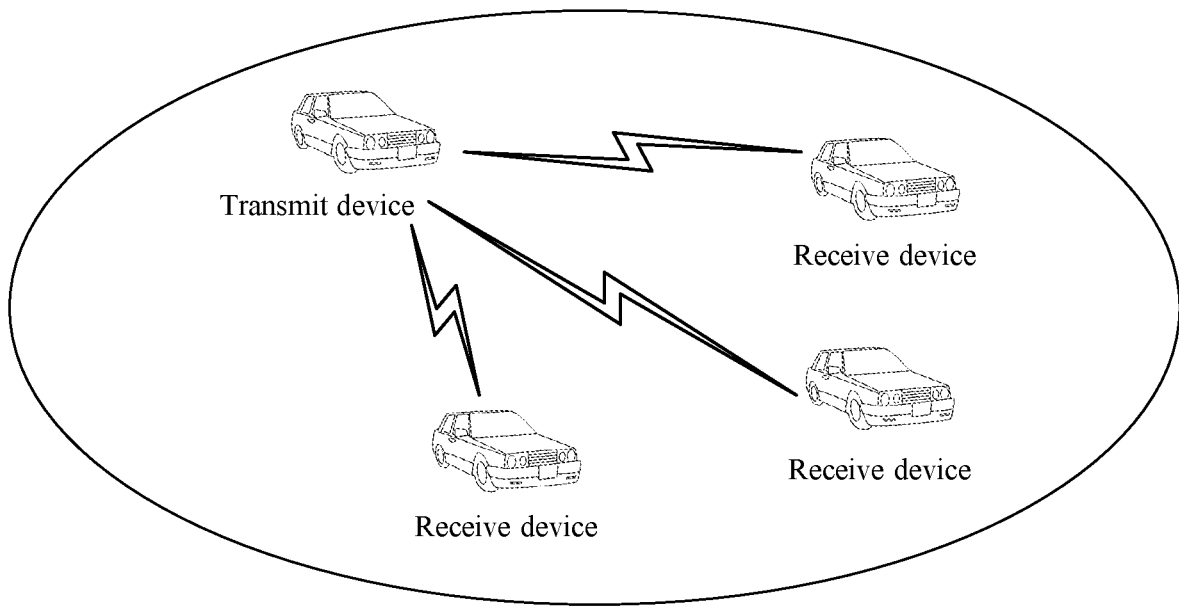
FIG. 3B is a schematic diagram of another network architecture to which a data transmission method is applicable according to an embodiment of this application.

FIG. 3B is a schematic diagram of another network architecture to which a data transmission method is applicable according to an embodiment of this application. Refer to FIG. 3B. In a vehicle-to-everything (V2X) Internet of everything scenario, when in a cooperative driving state or a vehicle fleet state, one or more vehicles (transmit devices) need to multicast data such as sensing information and path planning information to another vehicle (a receive device). The receive device performs joint HARQ feedback on a plurality of pieces of data sent by the transmit device through multicast, so that the transmit device performs network encoding transmission based on the feedback. In this way, retransmission efficiency is improved and feedback resources are saved.

Figure 3C:
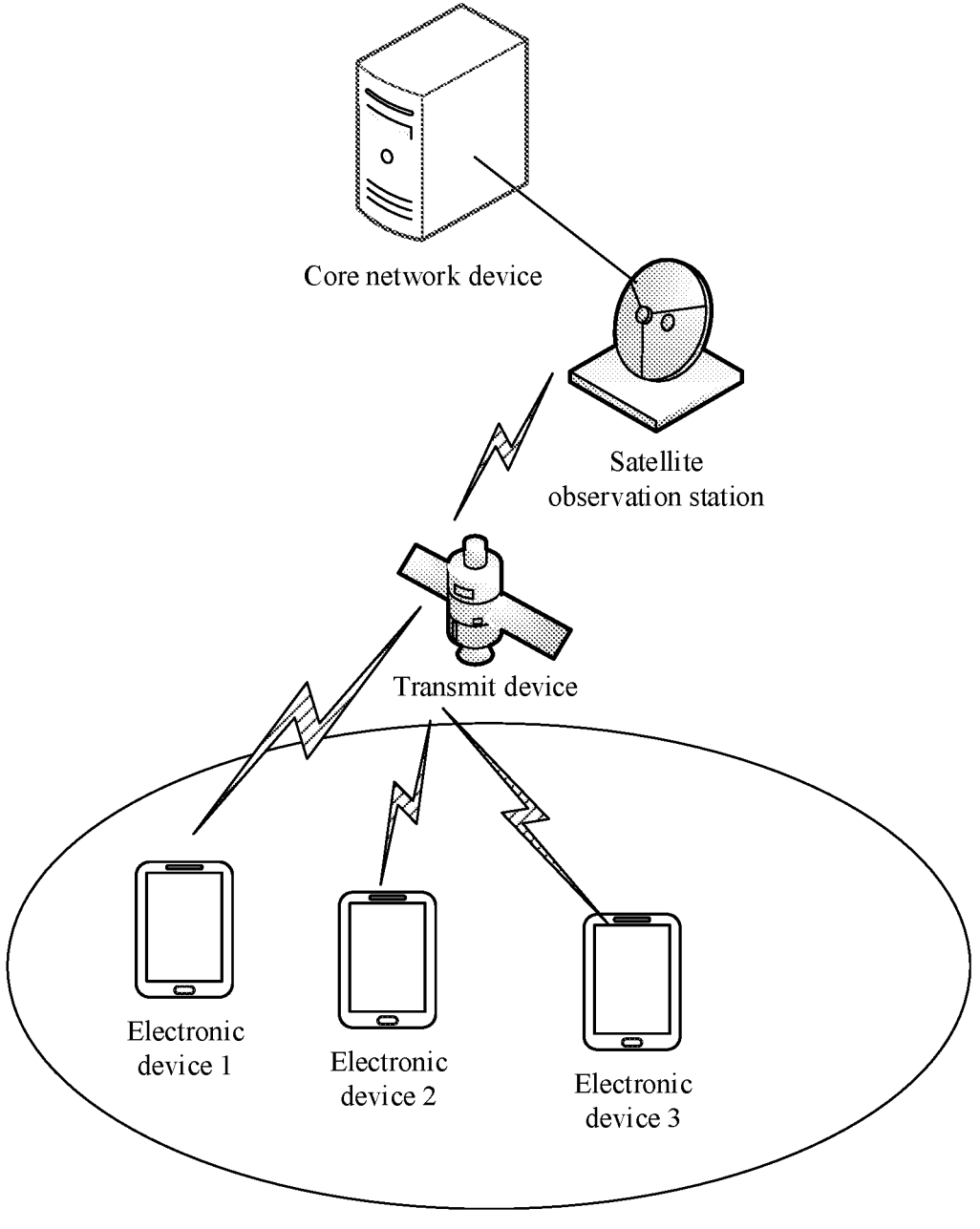
FIG. 3C is a schematic diagram of still another network architecture to which a data transmission method is applicable according to an embodiment of this application.

FIG. 3C is a schematic diagram of still another network architecture to which a data transmission method is applicable according to an embodiment of this application. For example, the network architecture is a satellite communication architecture, that is, a non-terrestrial network (NTN) architecture. For example, in the network architecture, a transmit device is a base station. The base station or some functions of the base station are deployed on a high-altitude platform or a satellite to provide coverage for an electronic device. An electronic device 1 to an electronic device 3 form a multicast group. The transmit device is connected to a core network device by using a satellite observation station or the like.

Figure 3D:
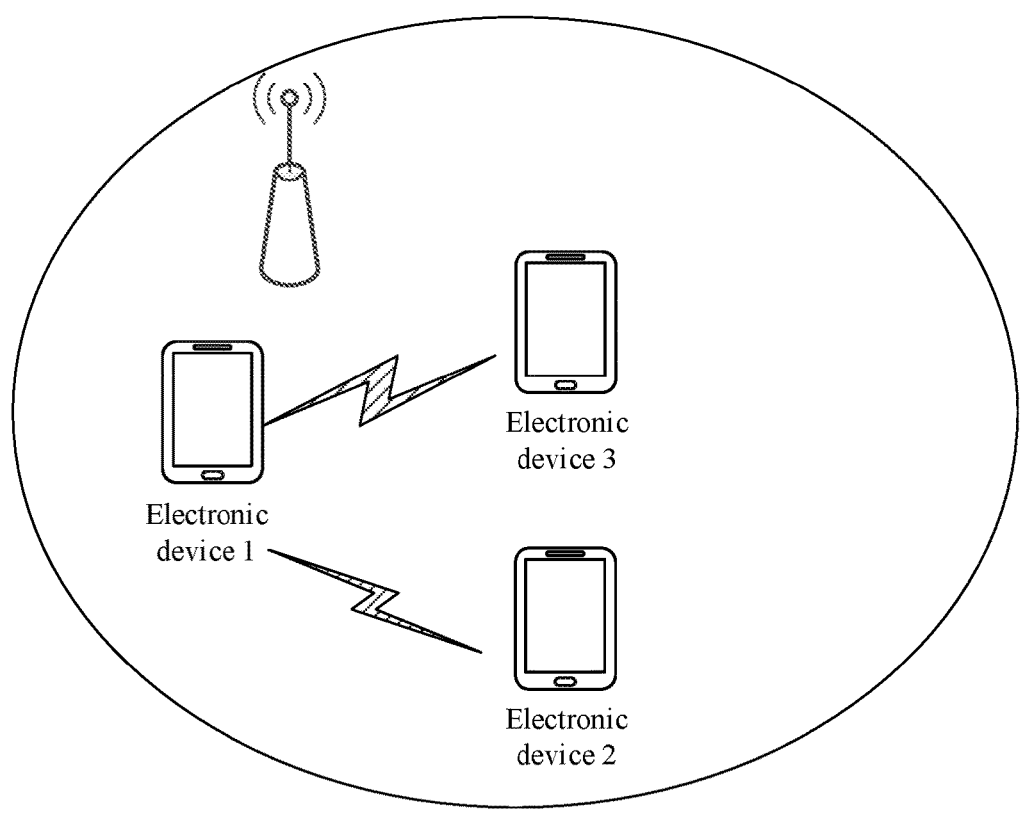
FIG. 3D is a schematic diagram of still another network architecture to which a data transmission method is applicable according to an embodiment of this application.

FIG. 3D is a schematic diagram of still another network architecture to which a data transmission method is applicable according to an embodiment of this application. For example, the network architecture is a device-to-device (D2D) communication architecture. The network architecture is used in a cellular network system of the 4th generation mobile communication technology (4G), a cellular network system of the 5th generation mobile communication technology (5G), or a cellular network system of a technology beyond the 5th generation mobile communication technology (beyond 5G). The D2D communication system includes a base station and an electronic device 1 to an electronic device 3. The electronic device 2 and the electronic device 3 form a multicast group. The electronic device 1 and the electronic device 2, and the electronic device 1 and the electronic device 3 are configured to perform D2D communication. In the D2D communication system, the base station may indicate, based on a distance between electronic devices and the like, whether to perform D2D communication between the electronic devices. The D2D communication architecture can be used in different scenarios, for example, peer-to-peer (P2P) communication in an Adhoc network, machine-to-machine (M2M) communication in the Internet of things, and the like.

The network encoding transmission described in embodiments of this application includes network encoding retransmission or network encoding initial transmission. Alternatively, the network encoding transmission includes partial retransmission and partial initial transmission.

Figure 4:
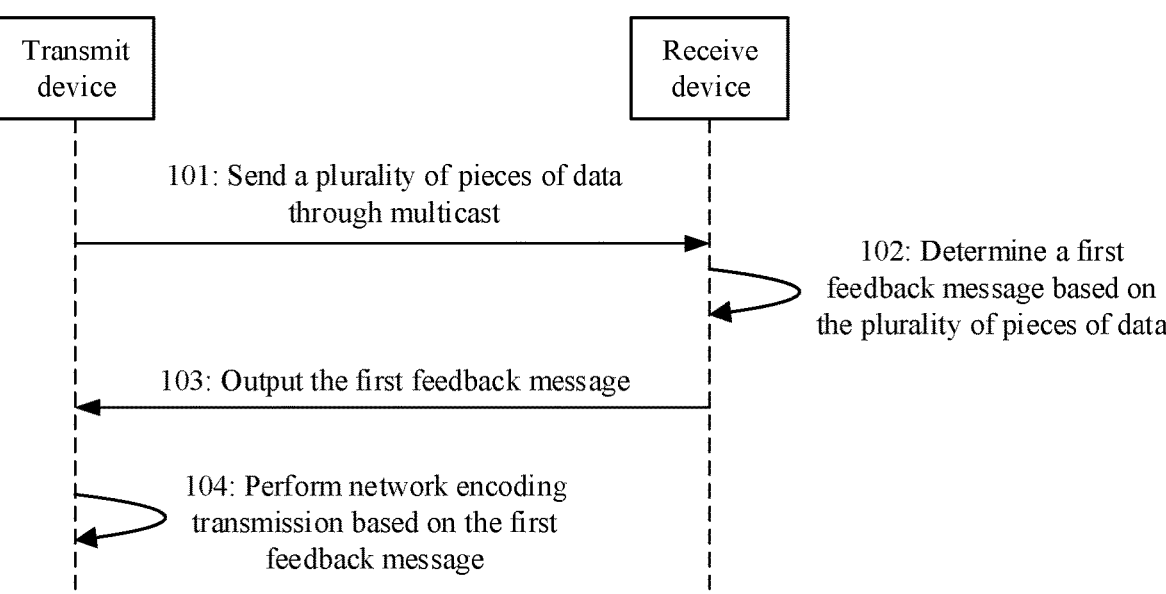
FIG. 4 is a flowchart of a data transmission method according to an embodiment of this application.

FIG. 4 is a flowchart of a data transmission method according to an embodiment of this application. In this embodiment, the data transmission method in this application is described from a perspective of interaction between a transmit device and a receive device. This embodiment includes the following steps.

101: The transmit device sends a plurality of pieces of data through multicast.

Correspondingly, any receive device that is in a multicast group and that is referred to as a first receive device below receives the plurality of pieces of data.

Different data in the plurality of pieces of data occupies different transmission resources.

For example, the plurality of pieces of data are data sent by the transmit device through multicast, and the transmit device sends different data on different transmission resources through multicast. For example, different transmission resources are different time domain resources, different frequency domain resources, different code domain resources, or the like. In this solution, the transmit device flexibly multicasts the data.

The foregoing plurality of pieces of data are for a same multicast group or different multicast groups. When the plurality of pieces of data are for the same multicast group, the data carries a same multicast identifier, and the multicast identifier is, for example, a radio network temporary identifier (RNTI). For example, refer to FIG. 3A. The plurality of pieces of data include data 1, data 2, and data 3, and the three pieces of data are data sent by the transmit device to the multicast group 1 through multicast. In this case, the data 1, the data 2, and the data 3 carry a same multicast identifier, and the first receive device in the multicast group 1 receives the three pieces of data.

When the foregoing plurality of pieces of data are for different multicast groups, the data carries different multicast identifiers. For example, refer to FIG. 3. The plurality of pieces of data include data 4 and data 5. The data 4 is data of the multicast group 1, and the data 5 is data of the multicast group 2. In this case, the data 4 carries an RNTI 1, and the data 5 carries an RNTI 2. The first receive device is any receive device in the multicast group 1. In this case, after receiving the data 4 and the data 5, the first receive device can identify the data of the first receive device and the data of the another multicast group based on the multicast identifiers, and jointly feed back for the data 4 and the data 5.

102: The first receive device determines a first feedback message based on the plurality of pieces of data.

The first feedback message indicates whether the first receive device correctly receives the plurality of pieces of data.

For example, after receiving the plurality of pieces of data, the first receive device determines one first feedback message based on a decoding state of each of the plurality of pieces of data. For one piece of data, there are two types of decoding results: correct or incorrect. Feedback content corresponding to the correct decoding result is an ACK, and feedback content corresponding to the incorrect decoding result is a NACK. After obtaining the decoding result of each piece of data, the first receive device determines feedback content of the first feedback message based on the decoding result. For example, the plurality of pieces of data include the data 1 and the data 2. If the first receive device successfully decodes the data 1 but fails to correctly decode the data 2, the content of the first feedback message is {ACK, NACK}. If the first receive device fails to correctly decode the data 1 but correctly decodes the data 2, the content of the first feedback message is {NACK, ACK}. If the first receive device correctly decodes the data 1 and the data 2, the content of the first feedback message is {ACK, ACK}. If the first receive device fails to correctly decode the data 1 and the data 2, the content of the first feedback message is {NACK, NACK}. For example, the content of the feedback message is {ACK, NACK}, {NACK, ACK}, {ACK, ACK}, and {NACK, NACK}, which are also referred to as decoding states.

103: The first receive device outputs the first feedback message.

Correspondingly, the transmit device receives the first feedback message.

For example, the first receive device sends the first feedback message to the transmit device.

104: The transmit device performs network encoding transmission based on the first feedback message.

For example, because the first feedback message indicates whether the first receive device correctly receives the plurality of pieces of data, the transmit device can determine, based on the first feedback message, which data is correctly received by the first receive device and which data is not correctly received by the first receive device. In other words, the transmit device can distinguish, based on the first feedback message, which data is correctly received and which data is not correctly received. For example, if a multicast group includes the first receive device and a second receive device, the plurality of pieces of data include the data 1 and the data 2, and the content of the first feedback message of the first receive device is {ACK, NACK}, it indicates that the first receive device correctly receives the data 1 but fails to correctly receive the data 2. If content of a feedback message of the second receive device is {NACK, ACK}, it indicates that the second receive device correctly receives the data 2 but fails to correctly receive the data 1. In this case, the transmit device performs network encoding retransmission on the data 1 and the data 2. The network encoding retransmission refers to performing an exclusive OR (XOR) operation on the data 1 and the data 2 and sending data 1 and data 2 that are obtained after the exclusive OR operation to the multicast group.

According to the data transmission method provided in this embodiment of this application, the transmit device sends the plurality of pieces of data through multicast, where different data in the data occupies different transmission resources. The first receive device in the multicast group receives the data, and determines the first feedback message based on the decoding result of the data. The first feedback message indicates whether the first receive device correctly decodes the data. The first receive device feeds back the first feedback message to the transmit device. The transmit device can distinguish, based on the first feedback message, which data in the plurality of pieces of data is correctly decoded by the multicast group and which data is not correctly decoded by the multicast group, to perform network encoding retransmission on the data that is in the plurality of pieces of data and that is not correctly received by the multicast group. In this way, retransmission efficiency is improved, a delay is reduced, and feedback resources are saved. Further, when the transmit device performs network encoding retransmission, data with a high priority is selected from the data that is not correctly received, and network encoding retransmission is preferentially performed on the data with the high priority. For example, the data with the high priority is delay-sensitive data. In this way, a delay is reduced.

In the foregoing embodiment, the first receive device determines a first feedback resource based on the feedback content of the first feedback message. The first feedback resource is included in a feedback resource set, and different first feedback resources in the feedback resource set correspond to different feedback content. In other words, different first feedback messages correspond to different first feedback resources. The first feedback resource is a feedback resource configured by using signaling or a feedback resource configured by the first receive device. When the first feedback resource is the resource configured by using the signaling, the transmit device preconfigures respective corresponding first feedback resources for different first feedback messages, and sends configuration information of the first feedback resource or configuration information of the feedback resource set to the first receive device by using the signaling or the like. When the first receive device configures the first feedback resource by itself, the first receive device can determine the first feedback resource based on a resource on which the plurality of pieces of data are multicast by the transmit device, that is, the foregoing transmission resource. For example, if a transmission resource one-to-one corresponds to a feedback resource, the first receive device determines a start location (for example, a time-frequency-code resource) of the feedback resource or the feedback resource set based on head data, tail data, or a location of a start resource (for example, a time frequency resource) of configured data in the plurality of pieces of data. Different feedback messages are arranged sequentially (for example, in ascending or descending order of frequencies and/or time) from the start location of the feedback resource according to a preset order. When feeding back the first feedback message to the transmit device, the first receive device determines the first feedback resource based on the first feedback message.

For example, one multicast group includes a receive device 1 and a receive device 2, the plurality of pieces of data include the data 1 and the data 2, and the first feedback message of the first receive device may be {ACK, NACK}, {NACK, ACK}, {ACK. ACK}, or {NACK, NACK}. {ACK, NACK}, {NACK, ACK}, {ACK, ACK}, or {NACK, NACK} each corresponds to one first feedback resource. For example, the four first feedback messages separately correspond to different first feedback resources. For another example, in the four first feedback messages, first feedback messages whose content is {ACK, NACK} and {NACK. ACK} correspond to a first feedback resource 1, but first feedback messages whose content is {ACK, ACK} and {NACK, NACK} respectively correspond to a first feedback resource 2 and a first feedback resource 3. If the content of the first feedback message is {ACK, NACK} or {NACK, ACK}, the first receive device feeds back the first feedback message on the first feedback resource 1. In this case, the receive device preconfigures the content of the first feedback message as any one of {ACK, NACK} or {NACK, ACK} to avoid mutual interference caused when messages having different content are transmitted on a same resource. If the content of the first feedback message is {ACK, ACK}, the first receive device feeds back the first feedback message on the first feedback resource 2.

In addition, when the content of the first feedback message is {ACK, ACK}, the first feedback message may have no corresponding first feedback resource. In other words, when the content of the first feedback message is {ACK, ACK}, the first receive device does not send the first feedback message to the transmit device.

Figure 5:
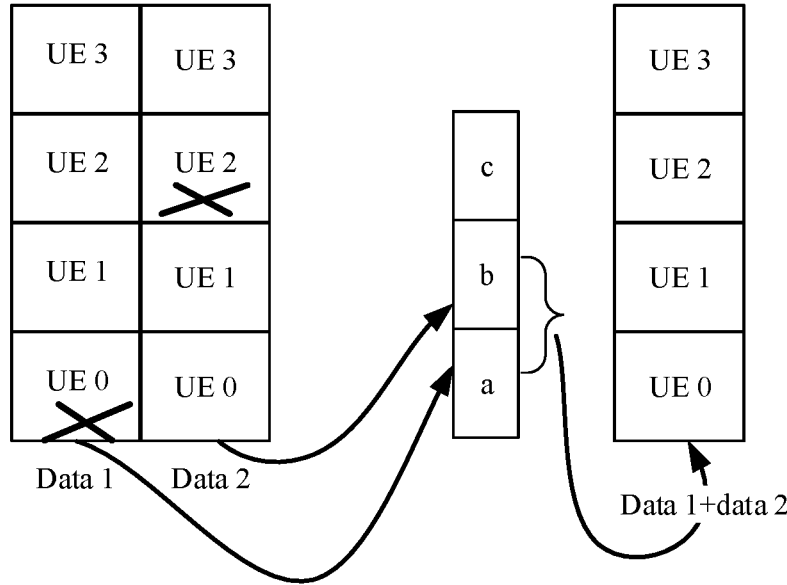
FIG. 5 is a schematic diagram of a process of a data transmission method according to an embodiment of this application.

FIG. 5 is a schematic diagram of a process of a data transmission method according to an embodiment of this application. Refer to FIG. 5. A multicast group includes four receive devices: UE 0, UE 1, UE 2, and UE 3, and a transmit device multicasts data 1 and data 2. Feedback resources include a feedback resource a to a feedback resource c.

The feedback resource a is used to feed back {NACK, ACK}, that is, NACK+ACK in the figure.

The feedback resource b is used to feed back {ACK, NACK}, that is, ACK+NACK in the figure.

The feedback resource c is used to feed back {NACK, NACK}, that is, NACK+NACK in the figure.

When receive devices, for example, the UE 0 and the UE 1 (the figure shows only that the UE 0 fails to correctly receive the data 1), whose content of feedback messages is NACK+ACK exist in the multicast group, both the UE 0 and the UE 1 feed back NACK+ACK to the transmit device on the feedback resource a.

If the UE 0 fails to correctly decode the data 1 but correctly decodes the data 2, the UE 0 feeds back {NACK, ACK} on the feedback resource a. If the UE 2 fails to correctly decode the data 2, but correctly decodes the data 1, the UE 2 feeds back {ACK, NACK} on the feedback resource b, and the other UEs correctly receive the data 1 and the data 2. After receiving the two feedback messages, the transmit device considers that at least one receive device that fails to correctly receive the data 1 and at least one receive device that fails to correctly receive the data 2 exist in the multicast group, where the two receive devices are not a same receive device. Therefore, the transmit device performs network encoding retransmission on the data 1 and the data 2.

Refer to FIG. 5. When the first receive device configures a first feedback resource by itself, the first receive device configures the first feedback resource based on transmission resources of the data 1 and the data 2. For example, time domain resources in the transmission resources occupied by the data 1 and the data 2 are separately a slot 1 and a slot 2, and a time domain resource in the first feedback resource is, for example, a slot 4, that is, the foregoing {NACK, ACK}, {ACK, NACK}, and {NACK, NACK} occupy a same time domain resource. However, frequency domain resources of different first feedback resources are different. In addition, the first feedback resource further includes a code domain resource, and the first receive device can configure the code domain resource based on an amount of code supported by one resource block. For example, the first receive device configures the code domain resource by using cyclic shift code of a ZC (Zadoff-chu) sequence.

In this solution, because a first feedback message one-to-one corresponds to the first feedback resource, after receiving the first feedback message, the transmit device can identify which data is correctly received and which data is not correctly received, to perform network encoding retransmission. In this way, retransmission efficiency is improved, a delay is reduced, and feedback resources are saved.

In the foregoing embodiment in FIG. 5, the plurality of pieces of data include the data 1 and the data 2. However, this is not limited in this embodiment of this application. In another feasible implementation, the plurality of pieces of data are, for example, three or more pieces of data. The following describes in detail the data transmission method in this embodiment of this application by using an example in which the plurality of pieces of data are three pieces of data. For example, refer to FIG. 6.

Figure 6:
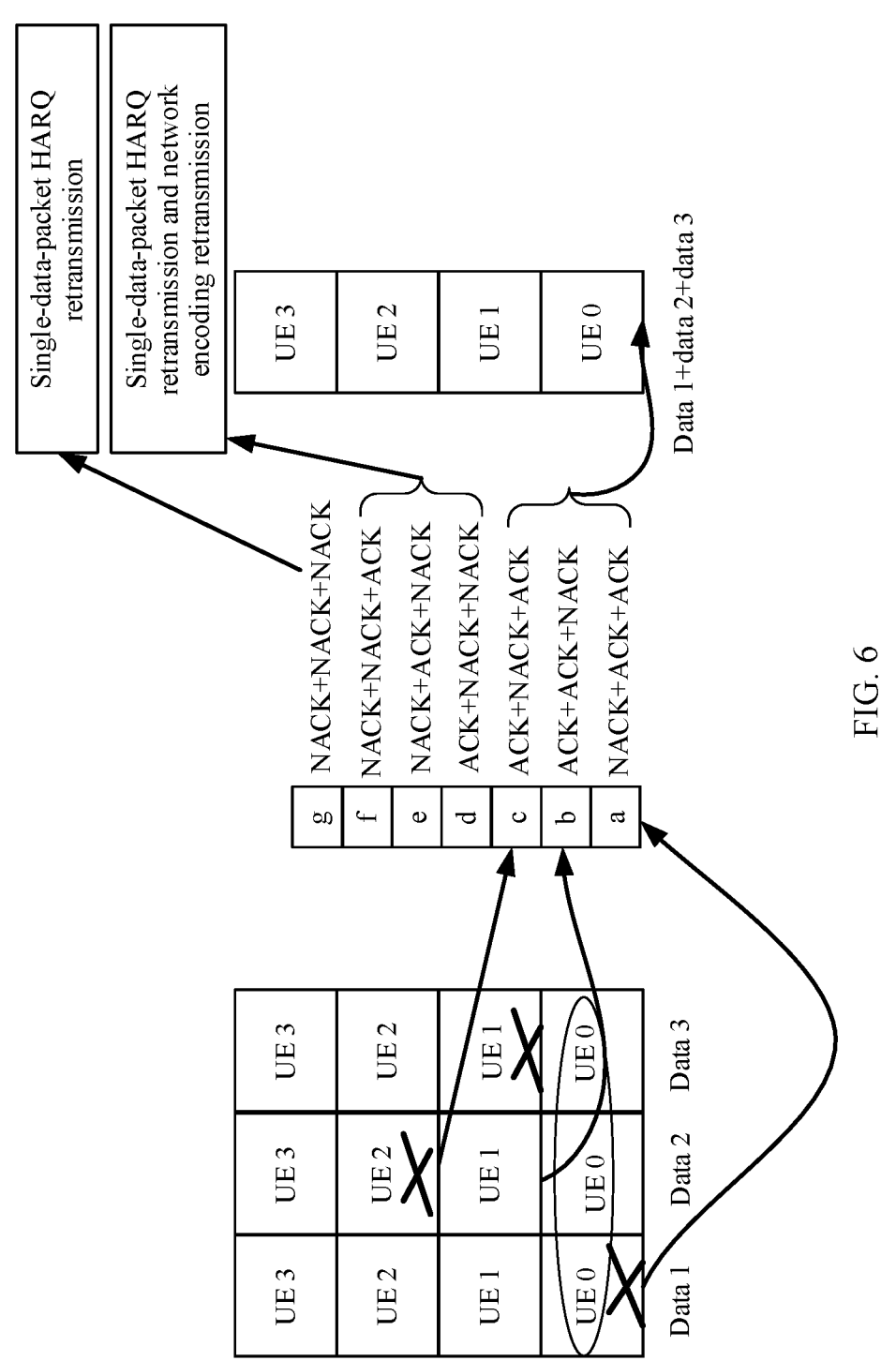
FIG. 6 is a schematic diagram of a process of a data transmission method according to an embodiment of this application.

FIG. 6 is a schematic diagram of a process of a data transmission method according to an embodiment of this application. Refer to FIG. 6. A multicast group includes four receive devices: UE 0, UE 1, UE 2, and UE 3, and a transmit device multicasts data 1, data 2, and data 3. Feedback resources or a feedback resource set includes a feedback resource a to a feedback resource g.

The feedback resource a is used to feed back {NACK, ACK, ACK}, that is, NACK+ACK+ACK in the figure.

The feedback resource b is used to feed back {ACK, ACK, NACK}, that is, ACK+ACK+NACK in the figure.

The feedback resource c is used to feed back {ACK, NACK, ACK}, that is, ACK+NACK+ACK in the figure.

The feedback resource d is used to feed back {ACK, NACK, NACK}, that is, ACK+NACK+NACK in the figure.

The feedback resource e is used to feed back {NACK, ACK, NACK}, that is, NACK+ACK+NACK in the figure.

The feedback resource f is used to feed back {NACK, NACK, ACK}, that is, NACK+NACK+ACK in the figure.

The feedback resource g is used to feed back {NACK, NACK, NACK}, that is, NACK+NACK+NACK in the figure.

In FIG. 6, all receive devices whose content of feedback messages is NACK+ACK+ACK in the multicast group feed back NACK+ACK+ACK on the feedback resource a. Similarly, the feedback resource b to the feedback resource g are occupied by receive devices having a same feedback message.

The UE 0 fails to correctly decode the data 1, but correctly decodes the data 2 and the data 3. Therefore, the UE 0 feeds back {NACK, ACK, ACK} on the feedback resource a.

The UE 1 fails to correctly decode the data 3, but correctly decodes the data 1 and the data 2. Therefore, the UE 1 feeds back {ACK, ACK, NACK} on the feedback resource b.

The UE 2 fails to correctly decode the data 2, but correctly decodes the data 1 and the data 3. Therefore, the UE 2 feeds back {ACK, NACK, ACK} on the feedback resource c.

The UE 3 correctly decodes the data 1, the data 2, and the data 3. Therefore, the UE 3 does not feed back.

After receiving only NACK+ACK+ACK, ACK+ACK+NACK, and ACK+NACK+ACK, the transmit device considers that a receive device that fails to correctly decode the data 1, a receive device that fails to correctly decode the data 3, and a receive device that fails to correctly decode the data 2 exist in the multicast group, where the three receive devices are different receive devices in the multicast group. In this case, the transmit device performs network encoding retransmission on the data 1, the data 2, and the data 3.

In addition, when receiving only NACK+ACK+ACK and ACK+ACK+NACK, the transmit device considers that a receive device that fails to correctly decode the data 1 and a receive device that fails to correctly decode the data 3 exist in the multicast group, where the two receive devices are different receive devices in the multicast group. In this case, each receive device in the multicast group of the transmit device correctly receives the data 2. Therefore, the transmit device performs network encoding retransmission only on the data 1 and the data 3.

When receiving only ACK+NACK+NACK and NACK+NACK+ACK, the transmit device considers that a receive device that fails to correctly decode the data 2 and the data 3 and a receive device that fails to correctly decode the data 1 and the data 2 exist in the multicast group, where the two receive devices are different receive devices. In this case, the transmit device performs network encoding retransmission on the data 1 and the data 3, and performs single-data-packet HARQ retransmission on the data 2.

Similarly, when receiving only ACK+NACK+NACK and NACK+ACK+NACK. the transmit device considers that a receive device that fails to correctly decode the data 2 and the data 3 and a receive device that fails to correctly decode the data 1 and the data 3 exist in the multicast group, where the two receive devices are different receive devices. In this case, the transmit device performs network encoding retransmission on the data 1 and the data 2, and performs single-data-packet HARQ retransmission on the data 3.

After receiving NACK+NACK+NACK, the transmit device considers that a receive device that fails to correctly decode the data 1, the data 2, and the data 3 exists in the multicast group. In this case, the transmit device separately performs single-data-packet HARQ retransmission on the data 1, the data 2, and the data 3.

It should be noted that when a feedback message received by the transmit device occupies only one or more of the feedback resource d, the feedback resource e, the feedback resource f, or the feedback resource g, the transmit device can also perform network encoding retransmission on all data sent through multicast. Alternatively, the transmit device selects some data to perform network encoding retransmission. If failing to correctly receive the data, the receive device may further perform feedback, and retransmission is performed.

In the foregoing embodiment, different first feedback messages correspond to different first feedback resources. For example, in FIG. 5, when the first receive device is the UE 0 a first feedback message of the UE 0 may be NACK+ACK, ACK+NACK, or NACK+NACK. Because each of NACK+ACK, ACK+NACK, or NACK+NACK corresponds to a different first feedback resource, after determining the first feedback message based on the data 1 and the data 2, the UE 0 determines a corresponding feedback resource from the feedback resource a, the feedback resource b, and the feedback resource c based on the first feedback message, and further performs feedback. However, this is not limited in this embodiment of this application. In another feasible implementation, different decoding states can also correspond to a same first feedback message, to correspond to a same first feedback resource. Refer to FIG. 5. Two decoding states: NACK+ACK and ACK+NACK, correspond to the feedback resource a. In this case, the two decoding states correspond to content of one type of feed-back message, and correspond to a same feedback resource. Regardless of whether decoding states of the data 1 and the data 2 are NACK+ACK or decoding ACK+NACK, the UE 0 performs feedback on the feedback resource a.

In the foregoing embodiment, the multicast group includes two or more receive devices. It is assumed that the first receive device and a second receive device are two different receive devices in the multicast group. The first receive device determines the first feedback resource based on the first feedback message, and sends the first feedback message to the transmit device on the first feedback resource. The second receive device determines a second feedback resource based on a second feedback message, and sends the second feedback message to the transmit device on the second feedback resource. Correspondingly, the receive device receives the first feedback message on the first feedback resource, and receives the second feedback message on the second feedback resource. The second feedback message indicates whether the second receive device correctly receives the plurality of pieces of data.

When the first feedback message is different from the second feedback message, the first feedback resource is different from the second feedback resource. For example, refer to FIG. 5. The first receive device is the UE 0, the second receive device is the UE 2, the first receive device feeds back NACK+ACK, and the second receive device feeds back ACK+NACK. In this case, the first feedback resource is the feedback resource a, and the second feedback resource is the feedback resource b. In this solution, different feedback messages occupy different feedback resources, and different feedback messages indicate different data that is not correctly received by the multicast group. Therefore, the transmit device can easily distinguish which data is correctly received and which data is not correctly received. In this way, network encoding retransmission efficiency is improved.

When the first feedback message is the same as the second feedback message, the first feedback resource is the same as the second feedback resource. For example, refer to FIG. 5. The first receive device is the UE 0, and the second receive device is the UE 1. It is assumed that the first receive device feeds back NACK+ACK, and the second receive device feeds back NACK+ACK. In this case, the first feedback resource is the feedback resource a, and the second feedback resource is also the feedback resource a.

For another example, in FIG. 6, NACK+ACK+ACK, ACK+ACK+NACK, and ACK+NACK+ACK all correspond to the feedback resource a. If the transmit device does not receive a feedback message on another feedback resource, and receives the feedback message only on the feedback resource a, the transmit device considers that a receive device that fails to correctly receive one or more of the data 1, the data 2, and the data 3 exists in the multicast group. Therefore, the transmit device performs network encoding retransmission on the data 1, the data 2, and the data 3. In this case, the receive device performs joint decoding and receiving of channel encoding and network encoding based on the previously transmitted data and the data on which network encoding retransmission is performed.

In this solution, because same feedback messages occupy a same feedback resource, resource overheads can be reduced.

In addition, the transmit device or a network side configures feedback messages of decoding states of different data as a same feedback message. In this case, even if decoding states of different receive devices are different, a feedback message having preset feedback content is sent. In this case, the first feedback resource is preconfigured for feeding back a feedback message including one piece of preset feedback content, and the preset feedback content corresponds to at least one piece of feedback content or at least one decoding state. For example, refer to FIG. 5. The first receive device is the UE 0 the second receive device is the UE 2, the first receive device feeds back NACK+ACK, and the second receive device feeds back ACK+NACK. The foregoing preset feedback content is any one of {ACK, NACK} or {NACK, ACK}, and feedback content corresponding to the preset feedback content includes {ACK, NACK} and {NACK, ACK}. In other words, regardless of whether the content of the feedback message of the receive device is {ACK, NACK} or {NACK, ACK}, the feedback message of the preset feedback content is fed back on the first feedback resource to avoid mutual interference caused when messages having different content are transmitted on a same resource. In this case, because all first feedback messages that correspond to UEs and that have different feedback content occupy the feedback resource a, the transmit device performs network encoding transmission on all the plurality of pieces of data.

In the foregoing embodiment, the preset feedback content corresponds to the at least one piece of feedback content. However, this is not limited in this embodiment of this application. In another embodiment, the preset feedback content corresponds to the at least one decoding state. Still refer to FIG. 5. It is assumed that the preset feedback content is {ACK, NACK}. Decoding states corresponding to the preset feedback content include {correct, incorrect} and {incorrect, correct}. In other words, regardless of whether a decoding state corresponding to the receive device is {correct, incorrect} or {incorrect, correct}, a feedback message whose content is {ACK, NACK} is fed back on the first feedback resource.

In this solution, because different data decoding states correspond to same feedback content and occupy a same feedback resource, resource overheads can be reduced.

In the foregoing embodiment, when performing network encoding retransmission, the transmit device performs network encoding retransmission on all receive devices in the multicast group. However, this embodiment of this application is not limited thereto. In another feasible implementation, one multicast group is grouped in advance, and a feedback resource is configured for each group. When performing network encoding retransmission, the transmit device performs network encoding retransmission only on one or more groups.

The transmit device or another device on the network side groups the receive devices in the multicast group in different manners. For example, the transmit device divides a coverage area into a plurality of regions, and areas of the regions are equal. In the regions, receive devices located in a same region belong to a same group. For another example, the transmit device determines received signal strength of each receive device in the multicast group, and groups the receive devices in the multicast group based on the received signal strength. For another example, the transmit device groups the receive devices in the multicast group based on identifiers of the receive devices.

After grouping the receive devices in the multicast group to obtain a plurality of groups, the transmit device or the another device on the network side sends a first indication message to the first receive device in the multicast group. The first indication message indicates a group to which the first receive device belongs in the multicast group. Optionally, the transmit device or the another device on the network side indicates a grouping rule by using the first indication message. For example, a receive device in a coverage area, a signal strength range, or a device identifier range belongs to a group. The receive device determines the group of the receive device based on the rule and a geographical location, signal strength, or an identifier of the receive device. In this solution, the receive devices in the multicast group are grouped, and the receive devices are explicitly or implicitly notified. In this way, the transmit device subsequently performs network encoding retransmission with receive devices in one or more groups to improve data retransmission efficiency.

In addition, in this embodiment of this application, groups to which different receive devices in a multicast group belong can be further preconfigured. This reduces signaling exchange and reduces resource overheads.

In the foregoing embodiment, it is assumed that the first receive device and a third receive device belong to a same multicast group, the first receive device belongs to a first group, the third receive device belongs to a second group, and the third receive device feeds back a third feedback message on a third feedback resource. Correspondingly, the transmit device receives the third feedback message on the third feedback resource. The third feedback message indicates whether the third receive device correctly receives the plurality of pieces of data.

For example, after grouping the receive devices in the multicast group, the transmit device configures a feedback resource for each group. Feedback resources of different groups in one multicast group are independent of each other, and receive devices belonging to a same group in the one multicast group share a feedback resource. For example, a multicast group includes the UE 1, the UE 2, the UE 3, and UE 4, the UE 1 and the UE 2 belong to a first group, and the UE 3 and the UE 4 belong to a second group. In this case, the transmit device configures a feedback resource for the first group, and configures a feedback resource for the second group, where the two feedback resources are independent of each other. For the first group, the feedback resource of the first group includes three parts, which are respectively used to feed back NACK+ACK, ACK+NACK, and NACK+NACK. When feedback messages of the UE 1 and the UE 2 are the same, the two feedback messages occupy the same feedback resource.

In addition, in the foregoing embodiment, when content of the feedback message includes only the ACK but does not include the NACK, the transmit device may or may not configure the feedback resource for the feedback message. In this case, if the feedback resource is configured for the feedback message that does not include the NACK, the feedback resource of the first group includes four parts, which are respectively used to feed back NACK+ACK, ACK+NACK, NACK+NACK, and ACK+ACK.

In this solution, different groups feed back on different feedback resources. In this way, the transmit device subsequently performs network encoding retransmission only for receive devices in one or more groups to improve data retransmission efficiency.

In a grouping scenario, when performing network encoding retransmission, the transmit device performs network encoding retransmission on each receive device in the first group and each receive device in the second group based on feedback messages of different groups, that is, based on the first feedback message and the third feedback message.

Figure 7:
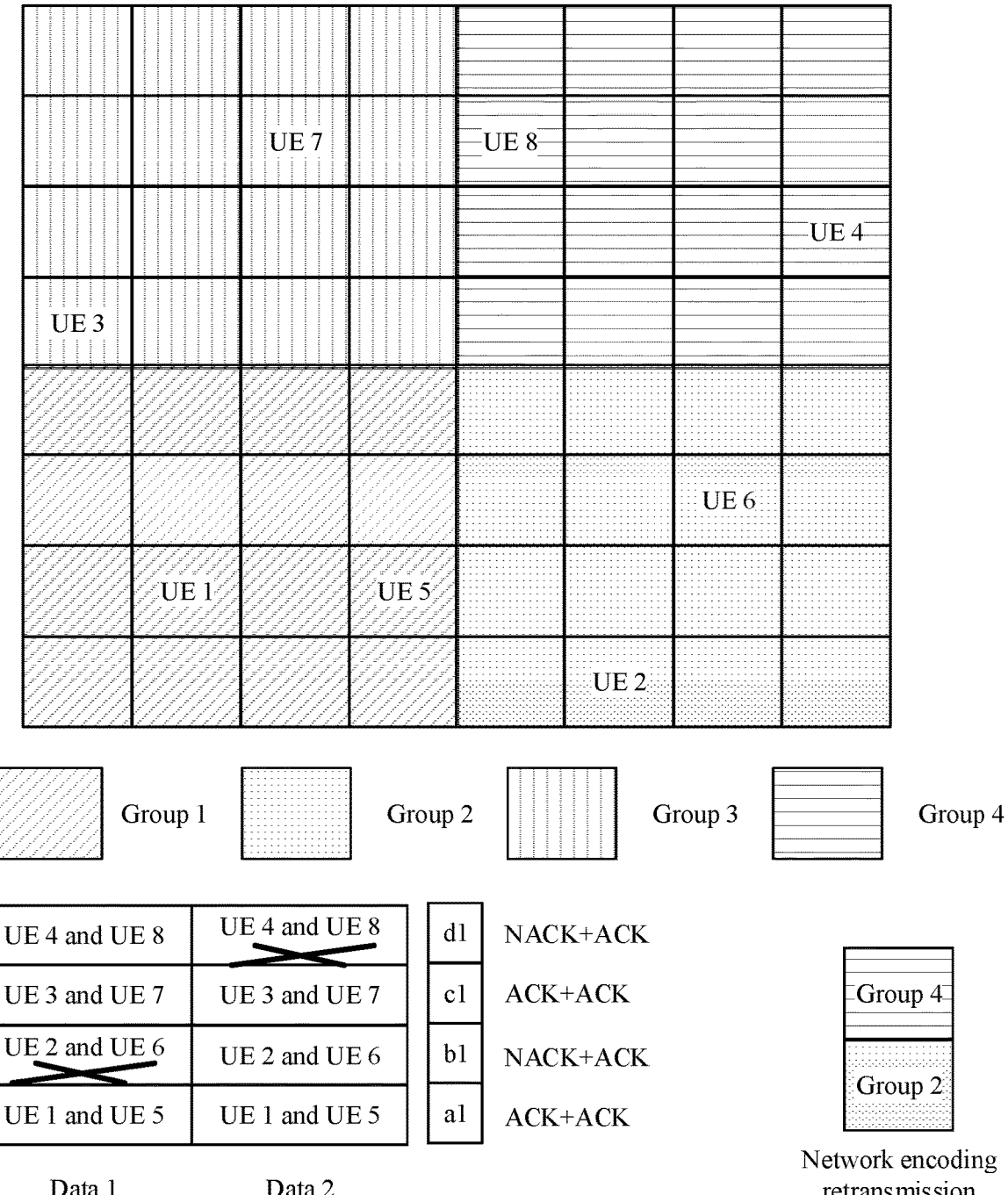
FIG. 7 is a schematic diagram of a process of a data transmission method according to an embodiment of this application.

FIG. 7 is a schematic diagram of a process of a data transmission method according to an embodiment of this application. Refer to FIG. 7. Eight receive devices exist in a coverage area of a transmit device: UE 1, UE 2, UE 3, UE 4, UE 5, UE 6, UE 7, and UE 8, and the eight receive devices belong to a same multicast group. The transmit device performs grouping based on geographical locations at which the receive devices are located, and divides the eight receive devices into four groups. The UE 1 and the UE 5 belong to a group 1, as shown in the part filled with slashes in the figure. The UE 2 and the UE 6 belong to a group 2, as shown in the part filled with dots in the figure. The UE 3 and the UE 7 belong to a group 3, as shown in the part filled with vertical lines in the figure. The UE 4 and the UE 8 belong to a group 4, as shown in the part filled with horizontal lines in the figure.

Refer to FIG. 7. Each group has an independent feedback resource or an independent feedback resource set. For example, a feedback resource a1 is a feedback resource used by the group 1 to feed back ACK+ACK, a feedback resource a2 is a feedback resource used by the group 1 to feed back ACK+NACK, a feedback resource a3 is a feedback resource used by the group 1 to feed back NACK+ACK, and a feedback resource a4 is a feedback resource used by the group 1 to feed back NACK+NACK.

For another example, a feedback resource b1 is a feedback resource used by the group 2 to feed back NACK+ACK, a feedback resource b2 is a feedback resource used by the group 2 to feed back ACK+NACK, a feedback resource b3 is a feedback resource used by the group 2 to feed back ACK+ACK, and a feedback resource a4 is a feedback resource used by the group 2 to feed back NACK+NACK.

For still another example, a feedback resource c1 is a feedback resource used by the group 3 to feed back ACK+ACK, a feedback resource c2 is a feedback resource used by the group 3 to feed back ACK+NACK, a feedback resource c3 is a feedback resource used by the group 3 to feed back NACK+ACK, and a feedback resource c4 is a feedback resource used by the group 3 to feed back NACK+NACK.

For still another example, a feedback resource d1 is a feedback resource used by the group 4 to feed back NACK+ACK, a feedback resource d2 is a feedback resource used by the group 4 to feed back ACK+NACK, a feedback resource d3 is a feedback resource used by the group 4 to feed back ACK+ACK, and a feedback resource d4 is a feedback resource used by the group 4 to feed back NACK+NACK.

It should be noted that FIG. 7 shows only the feedback resource a1 of the group 1, the feedback resource b1 of the group 2, the feedback resource c1 of the group 3, and the feedback resource d1 of the group 4. In addition, for description of different feedback messages occupying different feedback resources and the like in a same group, refer to the foregoing embodiment. Details are not described herein again. In addition, the present invention supports a case in which the feedback resource a1, the feedback resource b3, the feedback resource c1, and the feedback resource d3 do not need to be configured.

In FIG. 7, the transmit device multicasts data 1 and data 2, both the UE 1 and the UE 5 in the group 1 feed back ACK+ACK, both the UE 2 and the UE 6 in the group 2 feed back NACK+ACK, both the UE 3 and the UE 7 in the group 3 feed back ACK+ACK, and both the UE 4 and the UE 8 in the group 4 feed back NACK+ACK.

After receiving feedback messages on the feedback resource a1, the feedback resource b1, the feedback resource c1, and the feedback resource d1, the transmit device identifies that receive devices that fail to correctly decode the data 1 and the data 2 exist in the group 2 and the group 4. In this case, the transmit device performs network encoding retransmission on the data 1 and the data 2, and sends the data on which network encoding retransmission is performed to the group 2 and the group 4 through multicast.

In FIG. 7, an example in which the transmit device multicasts the two pieces of data is used for description. However, this is not limited in this embodiment of this application. In another feasible implementation, there are, for example, three or more pieces of data multicast by the multicast group. For example, refer to FIG. 8.

Figure 8:
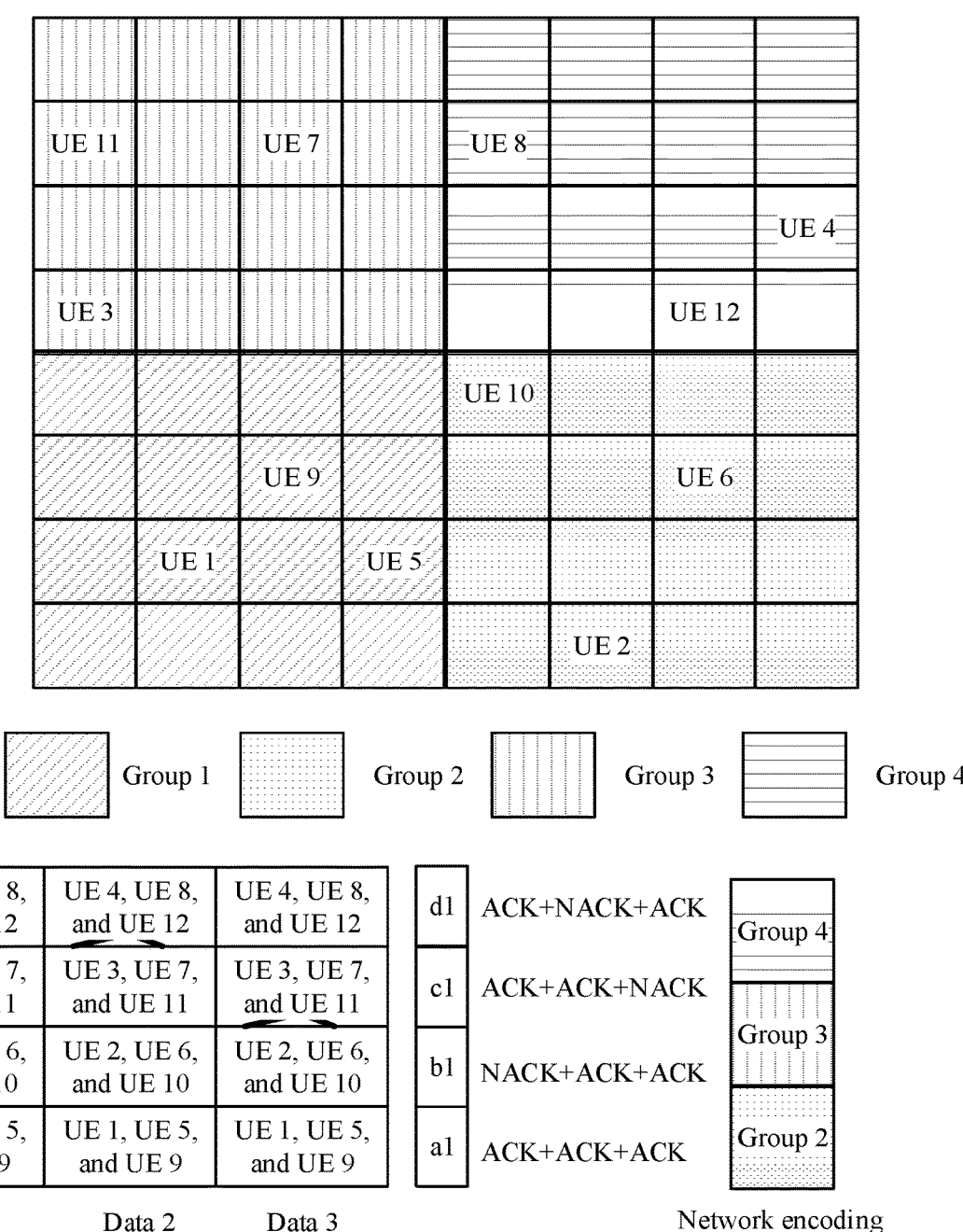
FIG. 8 is a schematic diagram of a process of a data transmission method according to an embodiment of this application.

FIG. 8 is a schematic diagram of a process of a data transmission method according to an embodiment of this application. Refer to FIG. 8. 12 receive devices in total exist in a coverage area of a transmit device: UE 1 to UE 12, and the 12 receive devices belong to a same multicast group. The transmit device performs grouping based on geographical locations at which the receive devices are located, and divides the 12 receive devices into four groups. The UE 1, the UE 5, and the UE 9 belong to a group 1, as shown in the part filled with slashes in the figure. The UE 2, the UE 6, and the UE 10 belong to a group 2, as shown in the part filled with dots in the figure. The UE 3, the UE 7, and the UE 11 belong to a group 3, as shown in the part filled with vertical lines in the figure. The UE 4, the UE 8, and the UE 12 belong to a group 4, as shown in the part filled with horizontal lines in the figure.

In these groups, each group has an independent feedback resource. For details, refer to the description in FIG. 7. Details are not described herein again.

In FIG. 8, the transmit device multicasts data 1, data 2, and data 3, each UE in the group 1 feeds back ACK+ACK+ACK, each UE in the group 2 feeds back NACK+ACK+ACK, each UE in the group 3 feeds back ACK+ACK+NACK, and each UE in the group 4 feeds back ACK+NACK+ACK.

After receiving feedback messages on a feedback resource a1, a feedback resource b1, a feedback resource c1, and a feedback resource d1, the transmit device identifies that receive devices that fail to correctly decode the data 1 and the data 2 exist in the group 2, the group 3, and the group 4. In this case, the transmit device performs network encoding retransmission on the data 1, the data 2, and the data 3, and sends the data on which network encoding retransmission is performed to the group 2, the group 3, and the group 4 through multicast.

In this solution, when performing network encoding retransmission, the transmit device performs network encoding retransmission only for receive devices in one or more groups based on feedback messages of different groups to improve data retransmission efficiency.

In the foregoing embodiment, the plurality of pieces of data sent by the transmit device through multicast are for a same multicast group. However, this is not limited in this embodiment of this application. In another feasible design, different data in the plurality of pieces of data separately corresponds to different multicast groups. In this case, a first feedback message indicates whether a first receive device correctly receives data of different multicast groups. For example, refer to FIG. 3A. The transmit device sends the data 1 and the data 2 through multicast. The data 1 corresponds to the multicast group 1, and the data 2 corresponds to the multicast group 2. The first receive device (any one of the electronic device 1, the electronic device 2, and the electronic device 3) in the multicast group 1 listens to the data 1 and the data 2, and performs joint feedback on the data 1 and the data 2. Similarly, the receive device in the multicast group 2 also listens to the data 1 and the data 2, and performs joint feedback on the data 1 and the data 2. The data 1 and the data 2 are located on different transmission resources, for example, different time domain resources, frequency domain resources, code domain resources, space domain resources, or polarization resources.

The data 1 and the data 2 carry different multicast identifiers. For example, the data 1 carries the RNTI 1, and the data carries the RNTI 2. For each piece of data, the data 1 is used as an example. The multicast identifier is loaded on the data 1, a pilot of the data 1, or a cyclic redundancy check (CRC) of the data 1. The receive device in the multicast group 1 can determine, based on the multicast identifiers carried in the data 1 and the data 2, data that needs to be received. For example, after receiving the data 1 that carries the RNTI 1, the receive device in the multicast group 1 considers that the data 1 is the data that needs to be received, and therefore stores the data 1. After the data 2 that carries the RNTI 2 is received, it is considered that the data 2 is data of another multicast group. Joint feedback is performed on the data 1 and the data 2, and the data 2 is discarded.

Figures 9, 10:
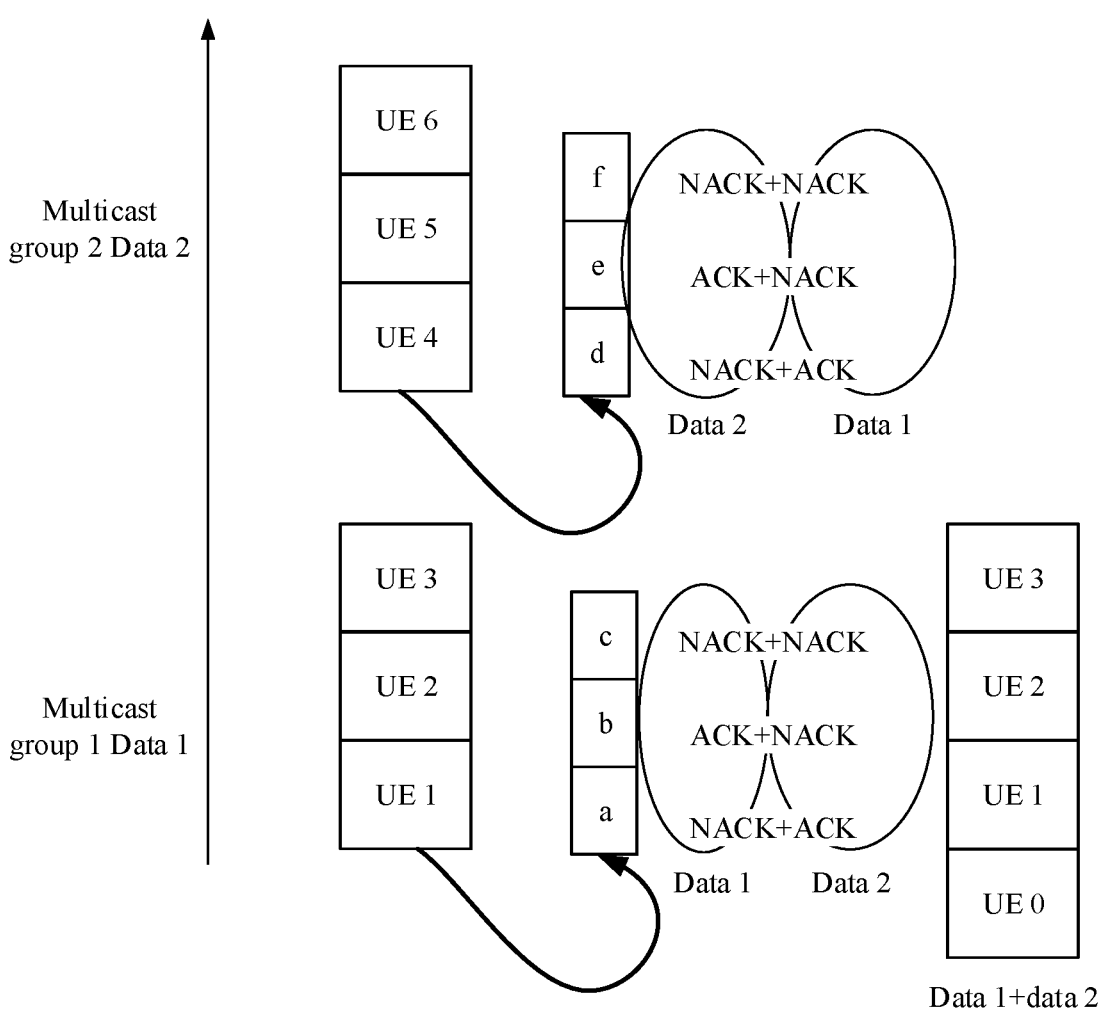
FIG. 9 is a schematic diagram of a process of a data transmission method according to an embodiment of this application.
FIG. 10 is a schematic diagram of a listener resource in a data transmission method according to an embodiment of this application.

FIG. 9 is a schematic diagram of a process of a data transmission method according to an embodiment of this application. Refer to FIG. 9. A transmit device multicasts data 1 and data 2. The data 1 for a multicast group 1 occupies a frequency resource 1, and the data 2 for a multicast group 2 occupies a frequency resource 2. The multicast group 1 includes three receive devices: UE 1, UE 2, and UE 3. The multicast group 2 includes three receive devices: UE 4, UE 5, and UE 6. In addition to listening to the data 1, the receive device in the multicast group 1 further listens to the data 2. Feedback resources or a feedback resource set of the multicast group 1 includes a feedback resource a to a feedback resource c.

The feedback resource a is used to feed back {NACK, ACK}, that is, NACK+ACK in the figure.

The feedback resource b is used to feed back {ACK, NACK}, that is, ACK+NACK in the figure.

The feedback resource c is used to feed back {NACK, NACK}, that is, NACK+NACK in the figure.

When feedback messages of different receive devices in the multicast group 1, for example, the UE 2 and the UE 3, are the same: NACK+ACK, the two feedback messages NACK+ACK occupy the feedback resource a. When decoding states of the receive device in the multicast group 1 in FIG. 9 is NACK+ACK and ACK+NACK, one type of feedback content can also be used for content of the two types of feedback messages based on a preconfiguration to share the feedback resource a. For details, refer to the foregoing description. Details are not described herein again.

When receiving the feedback message on the feedback resource a and the feedback resource b, the transmit device performs network encoding retransmission on the data 1 and the data 2. In addition, when the transmit device receives the feedback message only on the feedback resource a, because only the data 1 is not correctly received, the transmit device performs single-data-packet HARQ retransmission on the data 1, instead of performing network encoding retransmission on the data 1 and the data 2.

In addition to listening to the data 2, the receive device in the multicast group 2 further listens to the data 1. Feedback resources or a feedback resource set of the multicast group 2 includes a feedback resource d to a feedback resource f.

The feedback resource d is used to feed back {NACK, ACK}, that is, NACK+ACK in the figure.

The feedback resource e is used to feed back {ACK, NACK}, that is, ACK+NACK in the figure.

The feedback resource f is used to feed back {NACK, NACK}, that is, NACK+NACK in the figure.

When feedback messages of different receive devices in the multicast group 2, for example, the UE 5 and the UE 6, are the same: NACK+ACK, the two feedback messages NACK+ACK occupy the feedback resource d.

When receiving the feedback message on the feedback resource d and/or the feedback resource e, the transmit device performs network encoding retransmission on the data 1 and the data 2.

In the foregoing embodiment, in addition to network encoding retransmission performed by the transmit device, some receive devices can also perform network encoding retransmission. This type of network encoding retransmission is referred to as collaborative network encoding retransmission.

In a manner, the transmit device sends a second indication message to the first receive device. Correspondingly, the first receive device receives a second indication message. The second indication message indicates the first receive device to perform network encoding retransmission with a second receive device.

For example, the transmit device or a network side preconfigures, for the network encoding retransmission, retransmission resource such as a time domain resource, a frequency domain resource, a code domain resource, and a space domain resource, a modulation and coding scheme (MCS), a HARQ process, and a redundancy version (RV) of each piece of data that participates in the network encoding retransmission. For example, the HARQ process is a HARQ process of an initial piece of data or a HARQ process of a piece of data in the data that participates in the network encoding retransmission. After receiving the second indication message, the first receive device triggers the first receive device to perform network encoding retransmission based on the preconfiguration information.

For another example, the transmit device or the network side preconfigures some of the foregoing information, and adds remaining information to the second indication message. For example, the transmit device or the network side configures only the RV version of each piece of data that participates in the network encoding retransmission, and the second indication message includes the retransmission resource, the MCS, and the HARQ process that are for the network encoding retransmission.

For another example, the second indication message includes all related information of the network encoding retransmission, such as the retransmission resource, the MCS, the RV version of each piece of data that participates in the network encoding retransmission, the MCS, and the HARQ process. For example, the second indication message is information such as downlink control information (DCI), sidelink control information (SCI), or a radio resource control (RRC) or media access control (MAC) control element (CE). Alternatively, the second indication message is a combination of two or more pieces of the information.

In this solution, the receive device that performs collaborative network encoding retransmission needs to listen to a feedback message of another receive device. The collaborative network encoding retransmission can improve retransmission efficiency and a diversity gain, and facilitate correct receiving of data.

In another manner, the first receive device listens, on a listener resource, to a second feedback message fed back by the another receive device in the multicast group. The listener resource is a configured feedback resource or a resource other than a first feedback resource in the feedback resource set, and the first receive device belongs to the multicast group or a collaborative device group. The collaborative device group is directly configured by the transmit device or another device on the network side, or is determined based on a configuration rule. For example, a device in the collaborative device group is a device in a geographical location range. For another example, a device in the collaborative device group is a device in a signal strength range or a device in a device identifier range.

In this manner, the first receive device is preconfigured as the receive device for the collaborative network encoding retransmission. For example, a receive device whose identifier is A is preconfigured as the receive device for the collaborative network encoding retransmission. For another example, a receive device whose feedback message does not include the NACK is preconfigured as the receive device for the collaborative network encoding retransmission.

When the first receive device autonomously enters a collaborative network encoding mode, the first receive device needs to listen to the feedback message of the another receive device in the multicast group. If the first receive device is in a full-duplex mode, the first receive device directly listens to the feedback resource or the feedback resource set of the multicast group. If the first receive device is in a half-duplex mode, the first receive device listens, on the listener resource, to the second feedback message fed back by the another receive device in the multicast group. The listener resource may be another resource in configured feedback resources other than the first feedback resource. Alternatively, the listener resource is another feedback resource other than the feedback resource used by the first receive device. For example, for a plurality of feedback resources or the feedback resource set configured for multicast data transmission, each feedback resource corresponds to one type of feedback message. A feedback message of the first receive device occupies one type of feedback resource. In this case, a feedback resource corresponding to another feedback message is the listener resource.

Optionally, when the multicast group is divided into a plurality of groups, in addition to listening to a feedback resource of a group in which the first receive device is located, the first receive device further listens to a feedback resource of another group to perform cross-group auxiliary network encoding retransmission. In this case, because the feedback resource of this group has been configured for the first receive device, the transmit device needs to indicate the feedback resource of the another group to the first receive device. Further, feedback resources of the another group are feedback resources, in all feedback resources of the group, other than feedback resources used for feedback messages whose feedback content is the ACK.

In the foregoing collaborative network encoding retransmission, a mode in which the first receive device performs collaborative network encoding by itself is also referred to as an autonomous mode, and a mode in which the first receive device performs collaborative network encoding based on the indication of the transmit device is also referred to as an indication mode. The autonomous mode or the indication mode may be configured by the transmit device or the like.

The following uses an example in which the feedback resource is a time division multiplexing resource to describe in detail how the first receive device performs listening in the half-duplex mode.

FIG. 10 is a schematic diagram of a listener resource in a data transmission method according to an embodiment of this application. Feedback resources t1, t2, t3, and t4 are preconfigured according to FIG. 10. The four feedback resources are respectively used to feed back NACK+NACK, ACK+ACK, NACK+ACK, and ACK+NACK. NACK+NACK may also be represented as {NACK, NACK}. ACK+ACK may also be represented as {ACK, ACK}. NACK+ACK may be represented as {NACK, ACK}. ACK+NACK may be represented as {ACK, NACK}.

In FIG. 10, NN represents {NACK, NACK}, AA represents {ACK, ACK}, NA represents {NACK, ACK}, and AN represents {ACK, NACK}.

Refer to FIG. 10. Content of a feedback message of a first receive device is AA. Because the first receive device is in a half-duplex communication mode, the first receive device can send only the feedback message on the feedback resource t2, and cannot listen to a feedback message of another receive device. Therefore, listener resources are the feedback resource t1, the feedback resource t3, and the feedback resource t4. When the receive device obtains NACK+ACK and ACK+NACK on the feedback resources through listening, if obtaining no other feedback message through listening, the first receive device performs network encoding retransmission on the two pieces of data.

In this solution, the first receive device autonomously performs network encoding retransmission, and a transmit device does not need to send a second indication message, or even does not need to participate in the network encoding retransmission. Therefore, signaling overheads can be reduced, and workloads of the transmit device can be reduced.

In the foregoing embodiment, regardless of whether the first receive device receives the second indication message and performs collaborative network encoding retransmission, or the first receive device autonomously performs collaborative network encoding retransmission, the feedback message of the first receive device does not include the NACK (or includes only the ACK) or includes some NACKs. It is assumed that the transmit device sends three pieces of data through multicast. A multicast group includes three receive devices: UE 1, UE 2, and UE 3. The UE 1 performs collaborative network encoding. The UE 1 is a receive device that performs collaborative network encoding retransmission.

In one manner, the UE 1 autonomously determines data on which network encoding retransmission is to be performed. For example, content of a feedback message of the UE 1 is ACK+ACK+ACK. The UE 1 obtains, through listening, that content of a feedback message on a feedback resource 2 is NACK+ACK+ACK, and the UE 1 obtains, through listening, that content of a feedback message on a feedback resource 3 is ACK+NACK+ACK. In this case, the UE 1 performs collaborative network encoding retransmission on the data 1 and the data 2.

In another manner, the transmit device notifies, by using a second indication message or the like, the UE 1 of data or data that is in a specific feedback status on which network encoding retransmission needs to be performed. For example, the content of the feedback message of the UE 1 is ACK+ACK+ACK, content of a feedback message of the UE 2 is NACK+ACK+ACK, and content of a feedback message of the UE 3 is ACK+NACK+NACK. The transmit device indicates the UE 1 to perform network encoding retransmission on the data 2 and data 3. Alternatively, the transmit device indicates the UE 1 to perform network encoding retransmission on data whose feedback statuses are NACK+ACK+ACK and ACK+NACK+NACK. Therefore, the UE 1 performs collaborative network encoding retransmission on the data 2 and the data 3.

In still another implementation, the UE 1 performs collaborative network traversal retransmission on all correctly decoded data. For example, the transmit device sends five pieces of data through multicast, and the UE 1 correctly decodes the data 1 to the data 3, but fails to correctly decode data 4 and data 5. Therefore, the UE 1 performs collaborative network encoding retransmission on the data 1, the data 2, and the data 3.

When grouping is considered, the first receive device can perform network encoding retransmission based on a feedback message on a feedback resource corresponding to a first group, and can also perform collaborative network encoding retransmission based on a feedback message on a feedback resource corresponding to a second group. For example, refer to FIG. 11.

Figure 11:
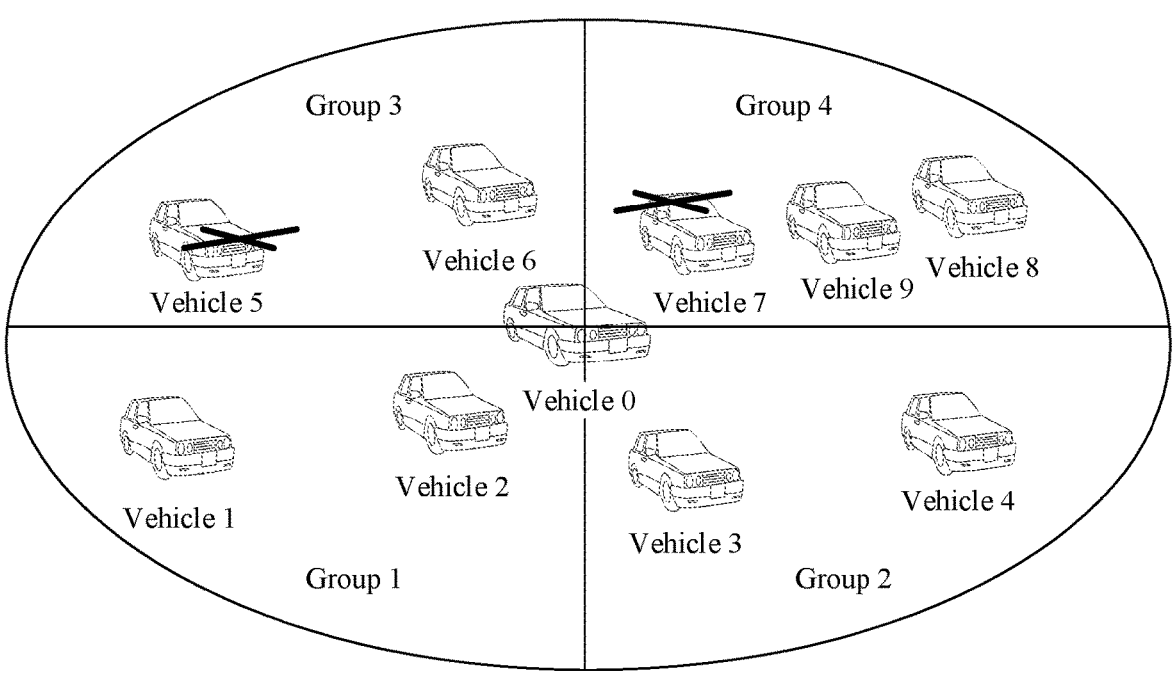
FIG. 11 is a schematic diagram of a collaborative network encoding retransmission in a data transmission method according to an embodiment of this application.

FIG. 11 is a schematic diagram of a collaborative network encoding retransmission in a data transmission method according to an embodiment of this application. Refer to FIG. 11. In a V2X scenario, a transmit device is a vehicle 0, and vehicles in a coverage area of the vehicle are divided into four groups: a group 1, a group 2, a group 3, and a group 4. The vehicle 0 sends four pieces of data through multicast, and content of a feedback message of a vehicle 6 is ACK+ACK+ACK+ACK. The vehicle 6 is a device that performs collaborative network encoding. The vehicle 6 obtains, through listening, that content of a feedback message from a vehicle 5 or the group 3 is ACK+NACK+NACK+ACK, and the vehicle 6 obtains, through listening, that content of a feedback message from a vehicle 7 or the group 4 is NACK+ACK+ACK+NACK. In this case, the vehicle 6 performs collaborative network encoding on the four pieces of data, and then sends four pieces of data obtained through collaborative network encoding to the vehicle 5 and the vehicle 7. The vehicle 5 and the vehicle 6 belong to a same group, and the vehicle 7 and the vehicle 6 belong to different groups.

In the foregoing embodiment, the first receive device performs collaborative network encoding retransmission autonomously or based on the indication of the transmit device. This can improve a retransmission diversity gain, and reduce a delay.

In the foregoing embodiment, the transmit device sends the plurality of pieces of data through multicast. After receiving the feedback message, the transmit device performs network encoding retransmission on the plurality of pieces of data. To improve network encoding retransmission performance, different redundancy versions may be used for data sent through multicast before and after the transmit device receives the feedback message.

In a manner, the transmit device indicates, by using signaling, the RV version of each piece of data during network encoding retransmission. For example, the transmit device sends the data 1 and the data 2 through multicast. If each piece of data has four redundancy versions, the transmit device uses 4-bit signaling to indicate a redundancy version of each piece of network encoded data. For example, four redundancy versions of the data 1 are an RV 0, an RV 1, an RV 2, and an RV 3, which are respectively represented as 00, 01, 10, and 11. Four redundancy versions of the data 2 are an RV 0, an RV 1, an RV 2, and an RV 3, which are respectively represented as 00, 01, 10, and 11. In this way, when the 4-bit signaling is 0000, it indicates that the redundancy version of the data 1 is the RV 0, and the RV of the data 2 is the RV 0. When the 4-bit signaling is 0011, it indicates that the redundancy version of the data 1 is the RV 0, and the RV of the data 2 is the RV 2.

In addition, the transmit device sends the data 1 and the data 2 through multicast. If each piece of data has two redundancy versions, the transmit device uses 2-bit signaling to indicate a redundancy version of each piece of data. The transmit device sends the data 1, the data 2, and the data 3 through multicast. If each piece of data has four redundancy versions, the transmit device uses 6-bit signaling to indicate a redundancy version of each piece of data.

In another manner, an RV version sequence is preconfigured, that is, based on an RV version of a previous data transmission, the transmit device and the receive device determine an RV version during current network encoding data transmission. The transmit device preconfigures an RV version sequence of each piece of data and sends the RV version sequence to the receive device in the multicast group. The preconfiguration information is sent to the first receive device in the multicast group by using RRC signaling, MAC signaling, physical (PHY) signaling, layer 1 signaling, or the like. The receive device determines, based on the preconfigured RV version sequence and the RV version of the previous data transmission, an RV redundancy version of the network encoded data during current network encoding retransmission. The RV version of the previous data transmission is notified by the transmit device to the receive device by using the signaling, or is determined by the receive device based on an RV version sequence of a data transmission before the previous data transmission and the preconfigured RV version sequence. Optionally, there may be a plurality of sets of RV version sequences. The transmit device indicates different RV version sequences to the receive device by using one type of signaling, and indicates, to the receive device by using another type of signaling, the RV version during network encoded data retransmission. For example, the transmit device configures the plurality of sets of RV version sequences by using semi-static signaling, the RRC signaling, or MAC CE signaling, and configures and selects, by using dynamic signaling such as the MAC CE signaling, the PHY signaling, or the L1 signaling, which set of the sequence of the plurality of sets of RV version sequences to be used during network encoded data retransmission.

TABLE 1

| RV version that is indicated by a third indication message and that is received before network encoding transmission or retransmission | RV used by data during network encoding |
|---|---|
| RV 0, RV 0 | RV 2, RV 2 |
| RV 0, RV 2 | RV 2, RV 3 |
| RV 0, RV 3 | RV 2, RV 1 |
| . . . | . . . |
| RV 1, RV 1 | RV 0, RV 0 |

Table 1 is a preset RV sequence table, and the RV sequence table stores an RV version of each piece of data in two adjacent data transmissions. For example, a previous output is an initial data transmission, and a next transmission is a network encoding retransmission. Alternatively, both the previous transmission and the next transmission are network encoding transmissions. Refer to Table 1. It is assumed that each piece of data has four RVs: the RV 0, the RV 1, the RV 2, and the RV 3, and an RV version sequence of each piece of data is preconfigured as the RV 0, the RV 2, the RV 3, and the RV 1, for example, an RV version sequence in which different data is transmitted on different time resources in a time sequence. The transmit device sends the data 1 and the data 2 through multicast, and the third indication message indicates that the RVs of the two pieces of data are both the RV 0. In this case, the first receive device considers that RV versions used by the transmit device to perform network encoding retransmission on the two pieces of data are both the RV 2, as shown in the second row in the figure. Table 1 is merely an example, and one or more rows or a similar form may be actually used.

If the third indication message indicates that the RVs of the two pieces of data are respectively the RV 0 and the RV 2, the first receive device considers that the RV versions used by the transmit device to perform network encoding retransmission on the two pieces of data are respectively the RV 2 and the RV 3, as shown in the third row in the figure.

If the third indication message indicates that the RVs of the two pieces of data are respectively the RV 0 and the RV 3, the first receive device considers that the RV versions used by the transmit device to perform network encoding retransmission on the two pieces of data are respectively the RV 2 and the RV 1, as shown in the fourth row in the figure.

In addition, when performing network encoding retransmission, the transmit device further needs to indicate, to the first receive device in the multicast group, a HARQ process for network encoding data transmission to perform HARQ retransmission management. The HARQ process during network encoding data transmission may reuse a HARQ process of one piece of data in the network encoded data, for example, a HARQ process of head data. Correspondingly, a HARQ process indication of the network encoding data transmission may reuse a HARQ process indication of one data transmission. For example, for network encoding transmission performed on the data A and the data B, previous HARQ process indications of the data A and the data B are separately 3 bits, and the HARQ process indications of the data A and the data B respectively correspond to HARQ processes 3 and 6. In this case, the 3 bits are used for a HARQ process indication corresponding to a subsequent network encoding retransmission, and the corresponding HARQ process indication is 4.

In the foregoing embodiment, an example in which the transmit device multicasts the data 1 and the data 2 is used to describe that the transmit device sends the RV version indicating each piece of data. However, this is not limited in this embodiment of this application. When the transmit device sends three or more pieces of data through multicast, similarly, the transmit device indicates the RV version of each piece of data by using the third indication information, or determines, based on the preconfigured RV version sequence, an RV version of data on which current network encoding transmission is performed.

In this solution, the RV version of the network encoding data transmission is indicated to or preconfigured for the receive device. In this way, signaling indication overheads can be reduced, and multicast communication performance can be improved.

In the foregoing embodiment, the plurality of pieces of data are different transport blocks (TB). However, this is not limited in this embodiment of this application. In another feasible implementation, the plurality of pieces of data are, for example, a plurality of encoding subblocks or encoding subblock groups of a same TB. In this case, the transmit device multicasts or unicasts data (a transport block). After receiving the transport block, the first receive device obtains a plurality of encoding subblocks based on the transport block. Then, the first receive device determines a fourth feedback message based on the plurality of encoding subblocks, and sends the fourth feedback message to the transmit device. The fourth feedback message indicates whether the receive device correctly receives the encoding subblocks in the transport block.

For example, one TB can be decomposed into a plurality of encoding subblocks, and the encoding subblock is also referred to as a code block. Therefore, the plurality of pieces of data are a plurality of encoding subblocks in one TB. Alternatively, a plurality of encoding subblocks form one encoding subblock group, and the plurality of encoding subblock groups form one TB. Therefore, the first receive device can further obtain the fourth feedback message based on whether the encoding subblock groups are correctly decoded, and feed back the fourth feedback message.

In this solution, the first receive device performs joint feedback on the encoding subblocks or the encoding subblock groups of the one TB to save feedback resources and improve network encoding retransmission efficiency.

In the embodiment shown in FIG. 7 or FIG. 8, receive devices in a same group perform joint feedback on the plurality of pieces of data. However, this is not limited in this embodiment of this application. In another feasible implementation, receive devices in a same group perform independent feedback on the plurality of pieces of data. The following describes in detail how to perform independent feedback. For example, refer to FIG. 12.

Figure 12:
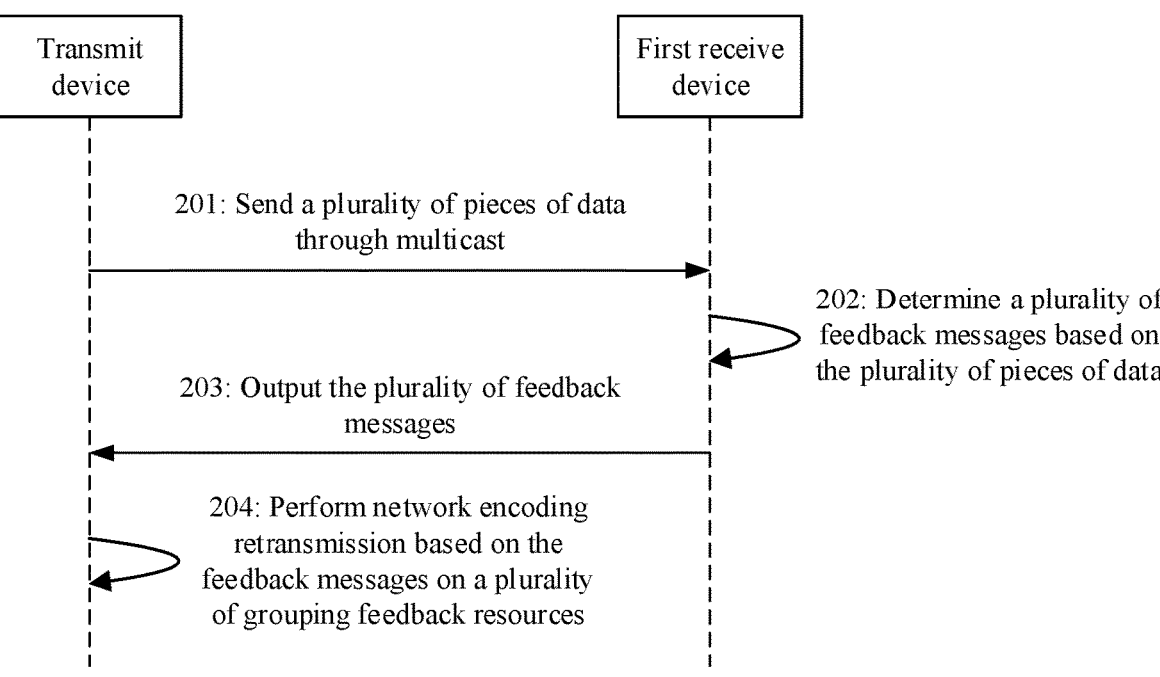
FIG. 12 is a flowchart of a data transmission method according to an embodiment of this application.

FIG. 12 is a flowchart of a data transmission method according to an embodiment of this application. This embodiment includes the following steps.

201: A transmit device sends a plurality of pieces of data.

Correspondingly, receive devices in a multicast group receive the plurality of pieces of data. A first receive device is any device in the multicast group. Therefore, the first receive device receives the plurality of pieces of data.

Different data in the plurality of pieces of data occupies different transmission resources.

202: The first receive device determines a plurality of feedback messages based on the plurality of pieces of data.

A feedback message in the plurality of feedback messages one-to-one corresponds to data in the plurality of pieces of data.

For example, for each of the plurality of pieces of data, the first receive device determines whether the data is correctly decoded, and obtains one feedback message based on a determining result. Because each piece of data corresponds to one feedback message, the first receive device can obtain a plurality of feedback results.

203: The first receive device outputs the plurality of feedback messages.

Correspondingly, the transmit device receives the plurality of feedback messages.

204: The transmit device performs network encoding retransmission based on the feedback messages on a plurality of feedback resources.

Because the multicast group includes a plurality of receive devices, the transmit device can receive a plurality of feedback messages from the receive devices.

When grouping is considered, the multicast group includes at least a first group and a second group. The first group includes the first receive device, a sub-resource in a first feedback resource corresponding to the first group one-to-one corresponds to the data in the plurality of pieces of data, and when feedback messages of different receive devices in the first group for a same piece of data in the plurality of pieces of data are the same, the feedback messages of different receive devices occupy a same sub-resource in the first feedback resource.

Figure 13:
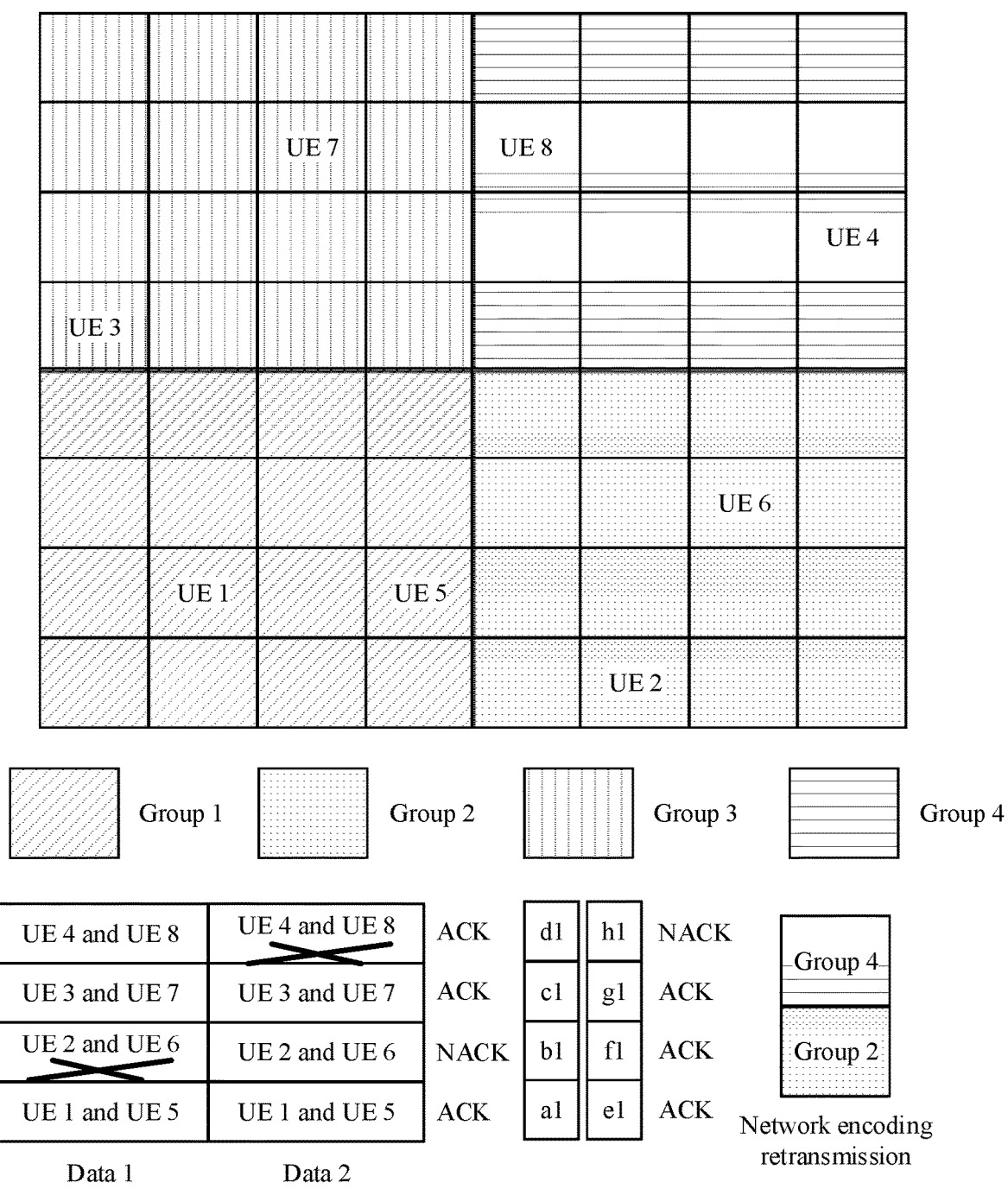
FIG. 13 is a schematic diagram of a process of a data transmission method according to an embodiment of this application.

FIG. 13 is a schematic diagram of a process of a data transmission method according to an embodiment of this application. Refer to FIG. 13. Eight receive devices exist in a coverage area of a transmit device: UE 1, UE 2, UE 3, UE 4, UE 5, UE 6, UE 7, and UE 8, and the eight receive devices belong to a same multicast group. The transmit device performs grouping based on geographical locations at which the receive devices are located, and divides the eight receive devices into four groups. The UE 1 and the UE 5 belong to a group 1, as shown in the part filled with slashes in the figure. The UE 2 and the UE 6 belong to a group 2, as shown in the part filled with dots in the figure. The UE 3 and the UE 7 belong to a group 3, as shown in the part filled with vertical lines in the figure. The UE 4 and the UE 8 belong to a group 4, as shown in the part filled with horizontal lines in the figure.

Refer to FIG. 13. Each group has an independent feedback resource for each of a plurality of pieces of data. The group 1 is used as an example.

When correctly decoding data 1, the receive device in the group 1 feeds back an ACK on a feedback resource a1.

When correctly decoding data 2, the receive device in the group 1 feeds back the ACK on a feedback resource e1.

When failing to correctly decode the data 1, the receive device in the group 1 feeds back a NACK on a feedback resource a2.

When failing to correctly decode the data 2, the receive device in the group 1 feeds back the NACK on a feedback resource e2.

The feedback resource a2 and the feedback resource e2 are not shown in the figure.

The group 2 is used as an example.

When failing to correctly decode data 1, the receive device in the group 2 feeds back a NACK on a feedback resource b1.

When correctly decoding data 2, the receive device in the group 2 feeds back an ACK on a feedback resource f1.

When correctly decoding the data 1, the receive device in the group 2 feeds back the ACK on a feedback resource b2.

When failing to correctly decode the data 2, the receive device in the group 2 feeds back the NACK on a feedback resource f2.

The feedback resource b2 and the feedback resource f2 are not shown in the figure.

The group 3 is used as an example.

When correctly decoding data 1, the receive device in the group 3 feeds back an ACK on a feedback resource c1.

When correctly decoding data 2, the receive device in the group 3 feeds back the ACK on a feedback resource g1.

When failing to correctly decode the data 1, the receive device in the group 3 feeds back a NACK on a feedback resource c2.

When failing to correctly decode the data 2, the receive device in the group 3 feeds back the NACK on a feedback resource g2.

The feedback resource c2 and the feedback resource g2 are not shown in the figure.

The group 4 is used as an example.

When correctly decoding data 1, the receive device in the group 4 feeds back an ACK on a feedback resource d1.

When failing to correctly decode data 2, the receive device in the group 4 feeds back a NACK on a feedback resource h1.

When failing to correctly decode the data 1, the receive device in the group 4 feeds back the NACK on a feedback resource d2.

When correctly decoding the data 2, the receive device in the group 4 feeds back the ACK on a feedback resource h2.

The feedback resource d2 and the feedback resource h2 are not shown in the figure.

The transmit device listens to the feedback message on the feedback resource a1 to the feedback resource h1 and the feedback resource a2 to the feedback resource h2. As shown in FIG. 13, if the transmit device obtains, through listening, feedback messages on the feedback resource b1 and the feedback resource h1, the transmit device identifies that the group 2 and the group 4 have receive devices that fail to correctly decode the data 1 and the data 2. In this case, the transmit device performs network encoding retransmission on the data 1 and the data 2, and sends the data on which network encoding retransmission is performed to the group 2 and the group 4 through multicast.

In FIG. 13, an example in which the transmit device multicasts the two pieces of data is used for description. However, this is not limited in this embodiment of this application. In another feasible implementation, there are, for example, three or more pieces of data multicast by the multicast group.

In this solution, receive devices in a same group independently feed back for the plurality of pieces of data, and the transmit device performs network encoding retransmission based on feedback messages in different groups to improve data retransmission efficiency.

It may be understood that, in this embodiment, after grouping the receive devices in the multicast group to obtain a plurality of groups, the transmit device or a network device sends a first indication message to a first receive device in the multicast group. The first indication message indicates a group to which the first receive device belongs in the multicast group. Optionally, the transmit device or another device on a network side may indicate a grouping rule by using the first indication message. For example, a receive device in a coverage area, a signal strength range, or a device identifier range belongs to a group. The receive device determines the group of the receive device based on the rule and a geographical location, signal strength, or an identifier of the receive device. In this solution, the receive devices in the multicast group are grouped, and the receive devices are explicitly or implicitly notified. In this way, the transmit device subsequently performs network encoding retransmission with receive devices in some groups to improve data retransmission efficiency.

In addition, in this embodiment of this application, groups to which different receive devices in a multicast group belong can be further preconfigured. This reduces signaling exchange and reduces resource overheads.

Figure 14:
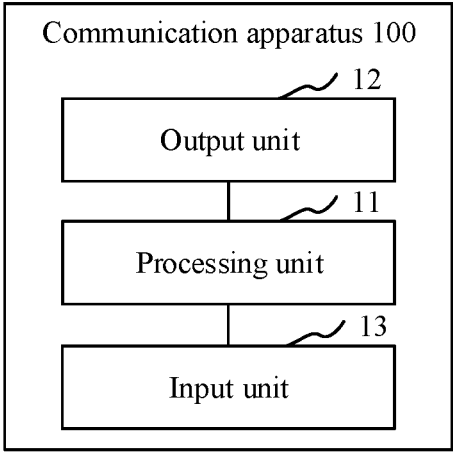
FIG. 14 is a schematic diagram of a structure of a communication apparatus according to an embodiment of this application.

FIG. 14 is a schematic diagram of a structure of a communication apparatus according to an embodiment of this application. The communication apparatus in this embodiment may be a first receive device, or may be a chip applied to the first receive device. The following uses an example in which the communication apparatus is the first receive device for description. The communication apparatus may be configured to perform functions of the first receive device in embodiments in FIG. 3A to FIG. 11. As shown in FIG. 5, the communication apparatus 100 includes a processing unit 11 and an output unit 12. Optionally, the communication apparatus 100 further includes an input unit 13.

The processing unit 11 is configured to: obtain a plurality of pieces of data, where different data in the plurality of pieces of data occupies different transmission resources, and determine a first feedback message based on the plurality of pieces of data, where the first feedback message indicates whether the first receive device correctly receives the plurality of pieces of data.

The output unit 12 is configured to output the first feedback message.

In a feasible design, the processing unit 11 is configured to determine a first feedback resource based on feedback content of the first feedback message, the first feedback resource is included in a feedback resource set, and different first feedback resources in the feedback resource set correspond to different feedback content.

The output unit 12 is configured to output the first feedback message on the first feedback resource.

In a feasible design, the input unit 13 is configured to receive a first indication message. The first indication message indicates a group to which the first receive device belongs in a multicast group, and the multicast group includes a plurality of groups.

In a feasible design, the plurality of pieces of data separately correspond to different multicast groups, and the first feedback message indicates whether the first receive device correctly receives the data of different multicast groups.

In a feasible design, the first feedback resource is used to feed back a feedback message including one piece of preset feedback content, and the preset feedback content corresponds to at least one piece of feedback content or at least one decoding state.

In a feasible design, the input unit 13 is configured to receive a second indication message. The second indication message indicates the first receive device to perform network encoding transmission with a second receive device.

In a feasible design, the processing unit 11 is further configured to: listen, on a listener resource, to a second feedback message fed back by another receive device in the multicast group, and perform network encoded data retransmission based on the second feedback message. The listener resource is another resource in configured feedback resources other than the first feedback resource, and the first receive device belongs to the multicast group.

In a feasible design, the transmission resource includes at least one of the following resources: a frequency resource, a time domain resource, a code domain resource, a space domain resource, and a polarization resource.

In a feasible design, the input unit 13 is configured to receive a third indication message. The third indication message indicates a redundancy version RV of each of the plurality of pieces of data.

The processing unit 11 is further configured to determine, based on the redundancy version RV of each of the plurality of pieces of data, an RV of each piece of data when a transmit device performs network encoding transmission.

In a feasible design, the processing unit 11 is configured to query a preconfigured RV sequence table based on the redundancy version RV of each of the plurality of pieces of data to determine the RV of each piece of data during network encoding transmission performed by the transmit device. The RV sequence table stores a correspondence between an RV version of each piece of data in a current network encoding transmission and an RV version of each piece of data in a previous data transmission.

In a feasible design, the processing unit 11 is further configured to: determine a plurality of encoding subblocks based on a transport block, and determine a fourth feedback message based on the plurality of encoding subblocks. The plurality of pieces of data are the plurality of encoding subblocks, and the fourth feedback message indicates whether the first receive device correctly receives the encoding subblocks in the transport block.

The output unit 12 is configured to output the fourth feedback message.

In a feasible design, each of the plurality of pieces of data carries a multicast identifier.

The communication apparatus provided in this embodiment of this application may perform actions of the receive device in embodiments in FIG. 3A to FIG. 11. Implementation principles and technical effects thereof are similar. Details are not described herein again.

Figure 15:
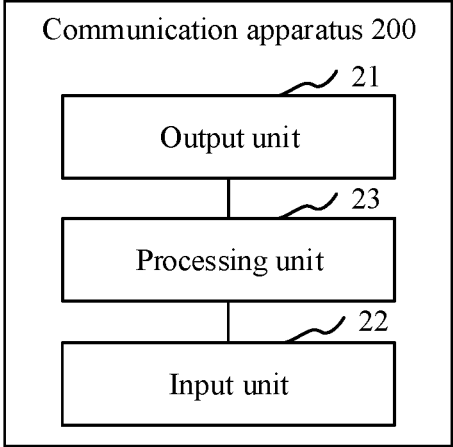
FIG. 15 is a schematic diagram of a structure of another communication apparatus according to an embodiment of this application.

FIG. 15 is a schematic diagram of a structure of another communication apparatus according to an embodiment of this application. The communication apparatus in this embodiment may be a transmit device, or may be a chip applied to the transmit device. The following uses an example in which the communication apparatus is the transmit device for description. The communication apparatus may be configured to perform functions of the transmit device in embodiments in FIG. 3A to FIG. 11. As shown in FIG. 15, the communication apparatus 200 includes an output unit 21, an input unit 22, and a processing unit 23.

The output unit 21 is configured to send a plurality of pieces of data, where different data in the plurality of pieces of data occupies different transmission resources.

The input unit 22 is configured to receive a first feedback message, where the first feedback message indicates whether a first receive device correctly receives the plurality of pieces of data.

The processing unit 23 is configured to perform network encoding transmission based on the first feedback message.

In a feasible design, the first feedback message occupies a first feedback resource, the first feedback resource is included in a feedback resource set, and different first feedback resources in the feedback resource set correspond to different feedback content.

In a feasible design, the input unit 22 is further configured to receive a second feedback message on a second feedback resource. The second feedback message indicates whether a second receive device correctly receives the plurality of pieces of data, the first feedback message is different from the second feedback message, and the first feedback resource is different from the second feedback resource.

In a feasible design, the input unit 22 is further configured to receive a second feedback message on the first feedback resource. The second feedback message indicates whether a second receive device correctly receives the plurality of pieces of data, and the first feedback message is the same as the second feedback message.

In a feasible design, the input unit 22 is further configured to receive a second feedback message on the first feedback resource. The second feedback message occupies the first feedback resource, the second feedback message indicates whether a second receive device correctly receives the plurality of pieces of data, and the first feedback message is different from the second feedback message.

In a feasible design, the first feedback resource is used to feed back a feedback message including one piece of preset feedback content, and the preset feedback content corresponds to at least one piece of feedback content or at least one decoding state.

In a feasible design, the output unit 21 is further configured to send a first indication message. The first indication message indicates a group to which the first receive device belongs in the multicast group, the multicast group includes a plurality of groups, and the first receive device and a second receive device belong to a same group in the multicast group.

In a feasible design, the input unit 22 is further configured to receive a third feedback message on a third feedback resource. The third feedback message indicates whether a third receive device correctly receives the plurality of pieces of data, the first receive device belongs to a first group in the multicast group, the third receive device belongs to a second group in the multicast group, and the third feedback resource is different from the first feedback resource.

In a feasible design, the processing unit 23 is configured to perform network encoding transmission with each receive device in the first group and the second group based on the first feedback message and the third feedback message.

In a feasible design, the plurality of pieces of data separately correspond to different multicast groups, and the first feedback message indicates whether the first receive device correctly receives the data of different multicast groups.

In a feasible design, the output unit 21 is further configured to send a second indication message. The second indication message indicates the first receive device to perform network encoding transmission with the second receive device.

In a feasible design, the transmission resource includes at least one of the following resources: a frequency resource, a time domain resource, a code domain resource, a space domain resource, and a polarization resource.

In a feasible design, the processing unit 23 is further configured to determine, based on an RV of each of the plurality of pieces of data, an RV of each piece of data during network encoding transmission. The output unit 21 is further configured to send a third indication message to the first receive device. The third indication message indicates the redundancy version RV of each of the plurality of pieces of data.

In a feasible design, the input unit 22 is further configured to receive a fourth feedback message. The fourth feedback message indicates whether the first receive device correctly receives encoding subblocks in a first transport block, and the plurality of pieces of data are the encoding subblocks in the first transport block.

The communication apparatus provided in this embodiment of this application may perform actions of the transmit device in embodiments in FIG. 3A to FIG. 11. Implementation principles and technical effects thereof are similar. Details are not described herein again.

Figure 16:
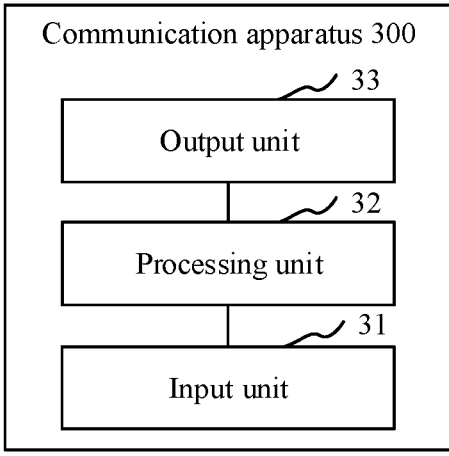
FIG. 16 is a schematic diagram of a structure of still another communication apparatus according to an embodiment of this application.

FIG. 16 is a schematic diagram of a structure of still another communication apparatus according to an embodiment of this application. The communication apparatus in this embodiment may be a receive device, or may be a chip applied to the receive device. The following uses an example in which the communication apparatus is the receive device for description. The communication apparatus may be configured to perform functions of the receive device in embodiments in FIG. 12 and FIG. 13. As shown in FIG. 16, the communication apparatus 300 includes an input unit 31, a processing unit 32, and an output unit 33.

The input unit 31 is configured to receive a plurality of pieces of data, where different data in the plurality of pieces of data occupies different transmission resources.

The processing unit 32 is configured to determine a plurality of feedback messages based on the plurality of pieces of data, where a feedback message in the plurality of feedback messages one-to-one corresponds to data in the plurality of pieces of data.

The output unit 33 is configured to output the plurality of feedback messages.

The communication apparatus provided in this embodiment of this application may perform actions of the receive device in embodiments in FIG. 12 and FIG. 13. Implementation principles and technical effects thereof are similar. Details are not described herein again.

Figure 17:
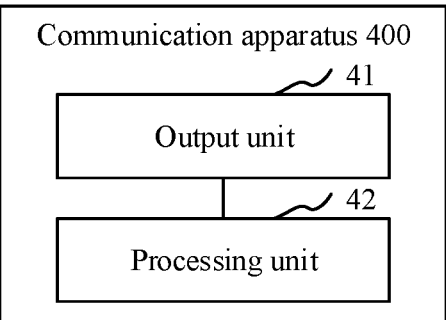
FIG. 17 is a schematic diagram of a structure of still another communication apparatus according to an embodiment of this application.

FIG. 17 is a schematic diagram of a structure of still another communication apparatus according to an embodiment of this application. The communication apparatus in this embodiment may be a transmit device, or may be a chip applied to the transmit device. The following uses an example in which the communication apparatus is the transmit device for description. The communication apparatus may be configured to perform functions of the transmit device in embodiments in FIG. 12 and FIG. 13. As shown in FIG. 17, the communication apparatus 400 includes an output unit 41 and a processing unit 42.

The output unit 41 is configured to send a plurality of pieces of data through multicast, where different data in the plurality of pieces of data occupies different transmission resources.

The processing unit 42 is configured to: receive feedback messages on a plurality of feedback resources, and perform network encoding transmission based on the feedback messages on the plurality of feedback resources. Different feedback resources in the plurality of feedback resources correspond to different groups in a multicast group, and the multicast group includes at least a first group and a second group. The first group includes a first receive device, a sub-resource in a first feedback resource corresponding to the first group one-to-one corresponds to data in the plurality of pieces of data, and when feedback messages of different receive devices in the first group for a same piece of data in the plurality of pieces of data are the same, the feedback messages of different receive devices occupy a same sub-resource in the first feedback resource.

The communication apparatus provided in this embodiment of this application may perform actions of the transmit device in embodiments in FIG. 12 and FIG. 13. Implementation principles and technical effects thereof are similar. Details are not described herein again.

It should be noted that, it should be understood that the input unit may be a receiver during actual implementation, and the output unit may be a transmitter during actual implementation. The processing unit may be implemented in a form of software invoked by a processing element, or may be implemented in a form of hardware. For example, the processing unit may be a separately disposed processing element, or may be integrated into a chip of the foregoing apparatus for implementation. In addition, the processing unit may alternatively be stored in a memory of the foregoing apparatus in a form of program code, and is invoked by a processing element of the foregoing apparatus to perform a function of the processing unit. In addition, all or a part of the units may be integrated together, or may be implemented independently. The processing element herein may be an integrated circuit and has a signal processing capability. In an implementation process, steps of the foregoing method or the foregoing units may be implemented by using a hardware integrated logical circuit in a processor element, or by using instructions in the form of software.

For example, the foregoing units may be one or more integrated circuits configured to implement the foregoing method, for example, one or more application-specific integrated circuits (ASIC), one or more microprocessors (digital signal processor, DSP), one or more field programmable gate arrays (FPGA), or the like. For another example, when one of the units is implemented in a form of scheduling program code by a processing element, the processing element may be a general-purpose processor, for example, a central processing unit (CPU) or another processor that can invoke the program code. For another example, the units may be integrated together and implemented in a form of a system-on-a-chip (SOC).

Figure 18:
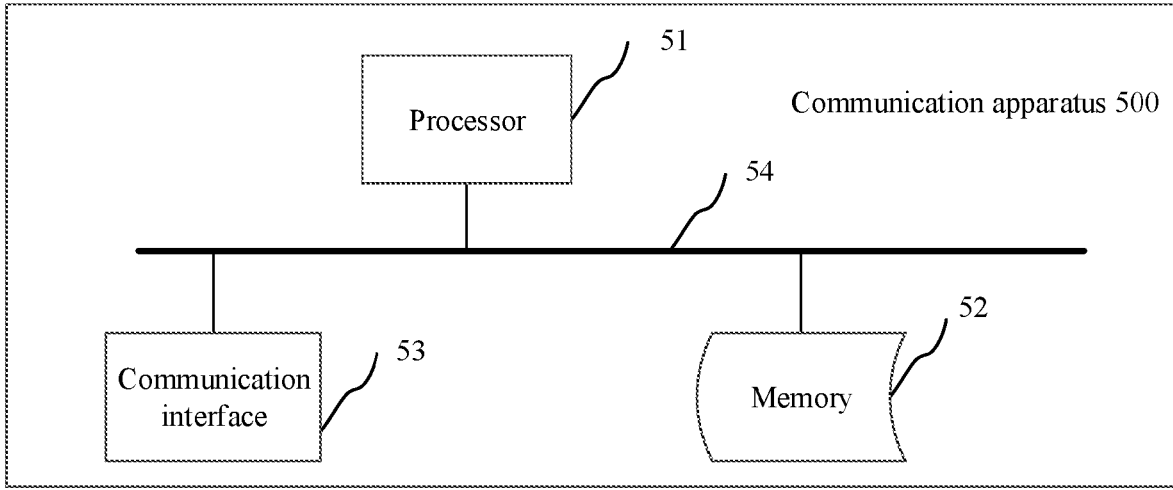
FIG. 18 is a schematic diagram of a structure of still another communication apparatus according to an embodiment of this application.

FIG. 18 is a schematic diagram of a structure of still another communication apparatus according to an embodiment of this application. As shown in FIG. 18, the communication apparatus 500 includes a processor 51 and a memory 52.

The memory 52 stores computer-executable instructions.

The processor 51 executes the computer executable instructions stored in the memory 52, so that the processor 51 is enabled to perform the data transmission method performed by the first receive device in embodiments in FIG. 3A to FIG. 11: the processor 51 is enabled to perform the data transmission method performed by the transmit device in embodiments in FIG. 3A to FIG. 11: the processor 51 is enabled to perform the data transmission method performed by the first receive device in embodiments in FIG. 12 and FIG. 13: or the processor 51 is enabled to perform the data transmission method performed by the transmit device in embodiments in FIG. 12 and FIG. 13.

For a specific implementation process of the processor 51, refer to the foregoing method embodiments. Implementation principles and technical effects thereof are similar. Details are not described herein again in this embodiment.

Optionally, the communication apparatus 500 further includes a communication interface 53. The processor 51, the memory 52, and the communication interface 53 may be connected through a bus 54.

In the foregoing implementation of the communication apparatus, the memory and the processor are directly or indirectly electrically connected to each other to implement data transmission or interaction. In other words, the memory and the processor may be connected by using an interface, or may be integrated together. For example, the elements may be electrically connected to each other through one or more communication buses or signal lines, for example, may be connected through a bus. The memory stores computer-executable instructions for implementing a data access control method, including at least one software function module that can be stored in the memory in a form of software or firmware. The processor executes various function applications and data processing by running a software program and module stored in the memory.

The memory may be but is not limited to a random access memory (RAM for short), a read-only memory (ROM for short), a programmable read-only memory (PROM for short), an erasable read-only memory (Erasable Programmable Read-Only Memory, EPROM for short), an electrically erasable read-only memory (Electric Erasable Programmable Read-Only Memory, EEPROM for short), and the like. The memory is configured to store a program, and the processor executes the program after receiving execution instructions. Further, the software program and module in the memory may further include an operating system. The operating system may include various software components and/or drivers used for system task management (for example, memory management, storage device control, and power management), and may communicate with various hardware or software components to provide a running environment of other software components.

The processor may be an integrated circuit chip and has a signal processing capability. The foregoing processor may be a general-purpose processor, including a central processing unit (CPU for short), a network processor (NP for short), or the like. The processor may implement or perform the methods, the steps, and the logical block diagrams that are disclosed in embodiments of this application. The general-purpose processor may be a microprocessor, or the processor may be any conventional processor or the like.

Based on the foregoing description, this application further provides a chip, including a logic circuit and an input interface. The input interface is configured to obtain to-be-processed data. The logic circuit is configured to perform the technical solution of the first receive device in the foregoing embodiments in FIG. 3A to FIG. 11 on the to-be-processed data to obtain processed data. Optionally, the chip may further include an output interface. The output interface is configured to output the processed data. The to-be-processed data obtained by the input interface includes data and the like multicast by a transmit device, and the processed data output by the output interface includes a feedback message and the like.

This application further provides a chip, including a logic circuit and an output interface. The logic circuit is configured to perform the technical solution of the transmit device in embodiments in FIG. 3A to FIG. 11 on to-be-processed data to obtain processed data. The output interface is configured to output the processed data. Optionally, the chip further includes an input interface. The input interface is configured to obtain the to-be-processed data. The to-be-processed data obtained by the input interface includes a feedback message and the like. The processed data output by the output interface includes data on which network encoding transmission is performed, and the like.

This application further provides a chip, including a logic circuit and an output interface. The logic circuit is configured to perform the technical solution of the receive device in embodiments in FIG. 12 and FIG. 13 on to-be-processed data to obtain processed data. The output interface is configured to output the processed data. Optionally, the chip further includes an input interface. The input interface is configured to obtain the to-be-processed data. The to-be-processed data obtained by the input interface includes data and the like multicast by a transmit device, and the processed data output by the output interface includes a feedback message and the like.

This application further provides a chip, including a logic circuit and an output interface. The logic circuit is configured to perform the technical solution of the transmit device in embodiments in FIG. 12 and FIG. 13 on to-be-processed data to obtain processed data. The output interface is configured to output the processed data. Optionally, the chip further includes an input interface. The input interface is configured to obtain the to-be-processed data. The to-be-processed data obtained by the input interface includes a feedback message and the like. The processed data output by the output interface includes data on which network encoding transmission is performed, and the like.

This application further provides a computer-readable storage medium. The computer-readable storage medium is configured to store a program, and when the program is executed by a processor, the program is used to perform the technical solution of the receive device in the foregoing embodiments.

This application further provides a computer-readable storage medium. The computer-readable storage medium is configured to store a program, and when the program is executed by a processor, the program is used to perform the technical solution of the transmit device in the foregoing embodiments.

An embodiment of this application further provides a computer program product. When the computer program product runs on a communication apparatus, the communication apparatus is enabled to perform the technical solution of the receive device in the foregoing embodiments, or the communication apparatus is enabled to perform the technical solution of the transmit device in the foregoing embodiments.

A person of ordinary skill in the art should understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a ROM, a RAM, a magnetic disk, or an optical disc. A specific medium type is not limited in this application.

What is claimed is:

1. A data transmission method comprising:
obtaining, by a first receive device, a plurality of pieces of data, wherein different data in the plurality of pieces of data occupies different transmission resources;
determining, by the first receive device, a first feedback message based on the plurality of pieces of data, wherein the first feedback message indicates whether the first receive device correctly receives the plurality of pieces of data;
outputting, by the first receive device, the first feedback message;
determining, by the first receive device, a first feedback resource based on feedback content of the first feedback message, wherein the first feedback resource is comprised in a feedback resource set, and different first feedback resources in the feedback resource set correspond to different feedback content; and
outputting, by the first receive device, the first feedback message on the first feedback resource.

2. The method according to claim 1, further comprising:
receiving, by the first receive device, a first indication message, wherein the first indication message indicates a group to which the first receive device belongs in a multicast group, and the multicast group comprises a plurality of groups.

3. The method according to claim 1, further comprising:
receiving, by the first receive device, a second indication message, wherein the second indication message indicates the first receive device to perform network encoding transmission with a second receive device.

4. The method according to claim 1, further comprising:
listening, by the first receive device on a listener resource, to a second feedback message fed back by another receive device in a multicast group, wherein the listener resource is another resource in configured feedback resources other than the first feedback resource, and the first receive device belongs to the multicast group; and performing, by the first receive device, network encoding data retransmission based on the second feedback message.

5. The method according to claim 1, wherein a transmission resource comprises at least one of the following resources: a frequency resource, a time domain resource, a code domain resource, a space domain resource, and a polarization resource.

6. The method according to claim 1, further comprising:
receiving, by the first receive device, a third indication message, wherein the third indication message indicates a redundancy version (RV) of each of the plurality of pieces of data; and
determining, by the first receive device, based on the redundancy version RV of each of the plurality of pieces of data, an RV of each piece of data in response to a transmit device performing network encoding transmission.

7. The method according to claim 1, wherein each of the plurality of pieces of data carries a multicast identifier.

8. A data transmission method comprising:
sending, by a transmit device, a plurality of pieces of data through multicast, wherein different data in the plurality of pieces of data occupies different transmission resources;
receiving, by the transmit device, a first feedback message, wherein the first feedback message indicates whether a first receive device correctly receives the plurality of pieces of data;
performing, by the transmit device, network encoding transmission based on the first feedback message; and
receiving, by the transmit device, a second feedback message on a second feedback resource, wherein the second feedback message indicates whether a second receive device correctly receives the plurality of pieces of data, the first feedback message is different from the second feedback message, and a first feedback resource is different from the second feedback resource.

9. The method according to claim 8, wherein the first feedback message occupies the first feedback resource, the first feedback resource is comprised in a feedback resource set, and different first feedback resources in the feedback resource set correspond to different feedback content.

10. The method according to claim 8, further comprising:
receiving, by the transmit device, a second feedback message on the first feedback resource, wherein the second feedback message indicates whether a second receive device correctly receives the plurality of pieces of data, and the first feedback message is the same as the second feedback message.

11. A communication apparatus comprising:
a memory comprising processor-executable instructions; and
a processor in communication with the memory, wherein the processor executes the processor-executable instructions to facilitate the apparatus to:
obtain a plurality of pieces of data, wherein different data in the plurality of pieces of data occupies different transmission resources, and determine a first feedback message based on the plurality of pieces of data, wherein the first feedback message indicates whether a first receive device correctly receives the plurality of pieces of data;
output the first feedback message;
determine a first feedback resource based on feedback content of the first feedback message, the first feedback resource is comprised in a feedback resource set, and different first feedback resources in the feedback resource set correspond to different feedback content; and
output the first feedback message on the first feedback resource.

12. The apparatus according to claim 11, wherein the processor further executes the processor-executable instructions to facilitate the apparatus to:
receive a first indication message, wherein the first indication message indicates a group to which the first receive device belongs in a multicast group, and the multicast group comprises a plurality of groups.

13. The apparatus according to claim 11, wherein the processor further executes the processor-executable instructions to facilitate the apparatus to:
receive a second indication message, wherein the second indication message indicates the first receive device to perform network encoding transmission with a second receive device.

14. The apparatus according to claim 11, wherein the processor further executes the processor-executable instructions to facilitate the apparatus to:
listen, on a listener resource, to a second feedback message fed back by another receive device in a multicast group, and perform network encoded data retransmission based on the second feedback message, wherein the listener resource is another resource in configured feedback resources other than the first feedback resource, and the first receive device belongs to the multicast group.

15. The apparatus according to claim 11, wherein a transmission resource comprises at least one of the following resources: a frequency resource, a time domain resource, a code domain resource, a space domain resource, and a polarization resource.

16. The apparatus according to claim 11, wherein the processor further executes the processor-executable instructions to facilitate the apparatus to:
receive a third indication message, wherein the third indication message indicates a redundancy version (RV) of each of the plurality of pieces of data; and
determine, based on the RV of each of the plurality of pieces of data, an RV of each piece of data in response to a transmit device performing network encoding transmission.

17. The apparatus according to claim 11, wherein each of the plurality of pieces of data carries a multicast identifier.

18. The method according to claim 10, further comprising:
sending, by the transmit device, a first indication message, wherein the first indication message indicates a group to which the first receive device belongs in a multicast group, the multicast group comprises a plurality of groups, and the first receive device and the second receive device belong to a same group in the multicast group.

19. The method according to claim 18, further comprising:
receiving, by the transmit device, a third feedback message on a third feedback resource, wherein the third feedback message indicates whether a third receive device correctly receives the plurality of pieces of data, the first receive device belongs to a first group in the multicast group, the third receive device belongs to a second group in the multicast group, and the third feedback resource is different from the first feedback resource.

20. The method according to claim 8, further comprising:

sending, by the transmit device, a second indication message, wherein the second indication message indicates the first receive device to perform network encoding transmission with the second receive device.

\* \* \* \* \*